United States Patent [19]

Leo et al.

[11] 4,110,240

[45] Aug. 29, 1978

[54] COPRECIPITATION PROCESS

[75] Inventors: Thomas J. Leo; Anders H. Johansson, both of Yardley, Pa.

[73] Assignee: Wyrough and Loser, Inc., Trenton, N.J.

[21] Appl. No.: 820,557

[22] Filed: Jul. 29, 1977

[51] Int. Cl.² .......................... C08C 1/14; C08J 3/20
[52] U.S. Cl. .................................... 252/182; 260/775; 260/776; 260/814; 260/821
[58] Field of Search ............... 252/182, 775, 776, 814, 252/821

[56] References Cited

U.S. PATENT DOCUMENTS

| | | | |
|---|---|---|---|
| 2,455,714 | 12/1948 | Waterman et al. | 260/821 |
| 2,459,748 | 1/1949 | Johnson | 260/821 |
| 2,572,884 | 10/1951 | Pollack et al. | 260/821 |
| 3,664,978 | 5/1972 | Uraneck et al. | 260/821 |
| 3,700,620 | 10/1972 | Burke | 260/33.6 AQ |

*Primary Examiner*—Benjamin R. Padgett
*Assistant Examiner*—Irwin Gluck
*Attorney, Agent, or Firm*—Edward S. Irons; James R. Laramie

[57] ABSTRACT

Products of a coprecipitation process comprising (i) substantially clear serum and (ii) homogeneous, essentially non-tacky, dustless, friable particles of predispersed rubber or plastic compounding chemical which comprise from about 80 to about 99.5 percent by weight of said chemical and from about 0.5 to about 20 percent by weight of a film-forming binder comprising a rubber or plastic polymer, wherein substantially all of the particles of the compounding chemical are at least 0.05 micron in size and no compounding chemical used is a reinforcing agent or diluent for rubber or plastic stock, are formed associatively.

66 Claims, 10 Drawing Figures

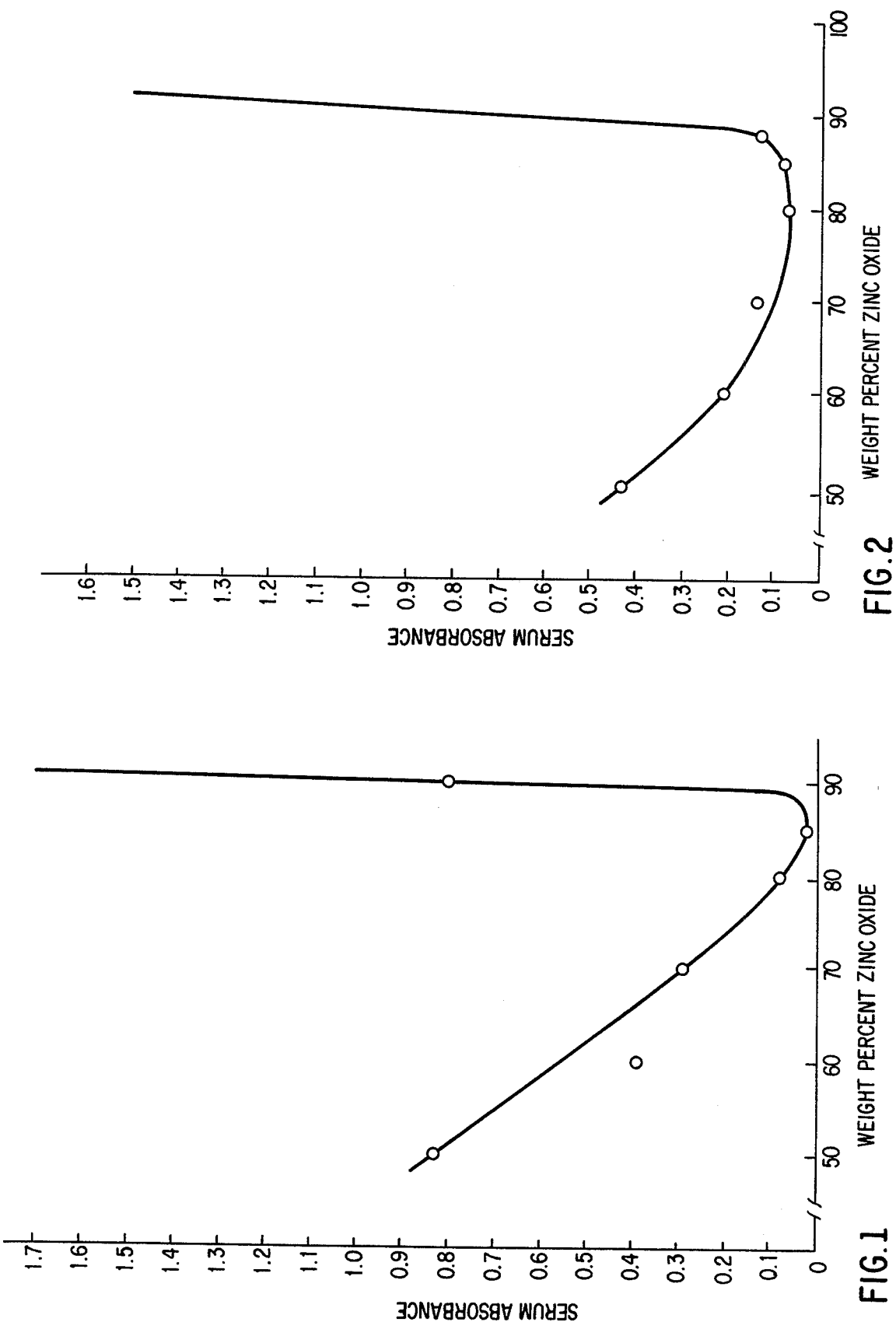

COPRECIPITATION PROCESS

BACKGROUND OF THE INVENTION

1. Field of the Invention

This invention relates to a process for preparing predispersed chemicals in the presence of substantially clear serum. More particularly, the invention relates to a process for coprecipitating a rubber or plastic compounding chemical with a binder emulsion containing a latex of a rubber or plastic polymer to produce a homogeneous predispersed chemical composition and a serum having improved clarity.

2. Description of the Prior Art

In the manufacture of articles of rubber or plastic, it is necessary to add various rubber or plastic compounding chemicals, such as cross-linking agents, activators, accelerators, antidegradants, vulcanizing agents, stabilizers, and the like. Conventional procedures for incorporating these compounding ingredients have generally included the use of masticating equipment such as Banbury mixers or rubber mills. Using these procedures, either the ingredients are blended directly with the rubber or plastic, or masterbatches of these ingredients are added during mixing. These compounding ingredients are of necessity very fine powders so that they can be incorporated homogeneously with a minimum amount of mixing.

In the form of finely divided dry powders, these compounding ingredients present many problems to both the manufacturer and the user. Dry grinding produces dust clouds of reactive substances and increases the rate of evaporation of the more volatile ones. As dust or vapor, these finely divided powdered chemicals are a health hazard to all persons who must work in a polluted atmosphere from the dry grinding operation to the rubber compounding stage.

During all of the mechanical manipulations of these powdered chemicals, such as during packaging, transportation, unpacking, weighing and adding to the mixing vessel, the issuing dust clouds represent wasted chemical. This leads to inaccurate addition of chemicals which adversely influences the reproducibility of the cure rate and physical properties of the product from batch to batch. Since most of these compounding ingredients affect the resulting physical properties of the cured formulations to some extent, they are usually highly reactive, undergo hydrolysis and oxidation reactions, and some are undesirably deliquescent. These same reactions cause eye irritation and chemical burns on the skin and mucous membranes of workers exposed to these dusts and vapors. In addition, these reactions with water and air represent an unknown loss of activity which varies with each batch.

There are further serious problems with the use of dry powdered chemicals during the mixing stage. In addition to the chemical lost as a dust cloud or vapor during mixing, some may fall through the rolls during mill mixing. Some chemicals cause the rubber or plastic stock to become dry and boardy while others soften the stock to the point where it becomes sticky. When used in certain combinations some chemicals form low melting eutectics that cause poor processibility and prereaction. Other difficulties are encountered during mixing because these chemicals are generally polar substances that are not easily wetted by the high molecular weight nonpolar hydrocarbon polymers and agglomerate into large particles rather than fully disperse.

These problems associated with handling, mixing and adequately dispersing powdered chemicals into tough polymer matrices have plagued the rubber and plastics industries since their inception. Several processing techniques have been developed to alleviate these problems, but each has had its drawbacks. There have been three main approaches to producing dustless compositions for the rubber and plastics industries, viz. oiled powders or pastes, extruded and subsequently dried pastes containing latex binders, and masterbatches of selected chemicals at relatively low concentrations of chemical made by a coprecipitation process. Oiled powders or pastes, which are commercially available for most rubber chemicals, are sticky, messy to handle, break up the stock when they are added and are not true dispersions since they usually contain agglomerates. The extruded paste preparations, unless made with very low molecular weight or semi-fluid polymers, are very hard and difficult to disperse, particularly in short mixing cycles. These pastes usually contain soaps and surfactants to prevent destabilization during preparation which adversely affect such properties as water swell of the final product. They also contain the electrolytes and soaps used to prepare the latex. U.S. Pat. Nos. 2,640,088 and 3,012,985 disclose dried paste products of this type.

The latex masterbatching technique has generally been limited to the coprecipitation of a filler material with a latex, and optionally a plasticizer, for use in reinforcing or diluting the rubber or plastic stock. Examples of latex masterbatches of reinforcing agents or diluents, such as carbon blacks or silicas, can be found in U.S. Pat. Nos. 2,229,534; 2,964,490; 3,014,005; 3,317,458; 3,356,623; 3,640,940; 3,664,978; 3,700,620 and British Patent No. 781,152. In each of these patents, the filler material is blended with a latex and the resulting mixture is coagulated and this filler material is always present in amounts no greater than 400 parts per hundred parts of polymer in the latex.

Latex masterbatching has also been suggested for use in coprecipitating pigments and vulcanizing agents. Using this method, General Tire & Rubber Company has prepared predispersions of sulfur (Ko-Blend) and tetramethyl thiuram disulfide (Kure-Blend MT) in rubber in which the chemical was present in amounts no greater than 100 parts per hundred parts of rubber. In Canadian Pat. No. 457,146, pigments are coprecipitated with latex to form compositions comprising less than about 70 percent by weight of pigment. In U.S. Pat. No. 1,558,688, clay is coprecipitated with a rubber latex to prepare a composition having 90 percent by weight of clay.

None of these prior art latex masterbatching processes has been completely satisfactory. It has been found that when the filler material or pigment was coprecipitated with a latex, the serum which was formed upon coagulation was not clear. The cloudiness in the serum was due to particles of the filler not coprecipitated with or bound to any polymer and suspended polymer particles. This cloudy serum has generally been discarded resulting in the loss of large quantities of filler material and/or polymer. These losses can be reduced by the use of coagulation aids, such as animal glues, Swift Colloids, American Cyanamid Magnifloc 573C, duPont Amine 248, and cationic polyamine-type coagulation aids, such as Nalco 107. In U.S. Pat. No. 3,664,978, a process is disclosed for reducing the losses of product in the form of fine particles of elastomer-oil, elastomer-oil-carbon black, or elastomer-carbon black in the serum of a latex masterbatching process. The patented process comprises mixing additional coagulant and latex to the partially or completely coagulated mixture. U.S. Pat. No. 3,700,620 discloses a process for reducing silica pigment losses in the serum during the preparation of an elastomer-silica pigment masterbatch. The patented process is a complex process involving the use of wet silica pigment having residual or bound alkali content with an elastomer latex containing hydroxy groups wherein the filler material is present in the coagulum in an amount less than 100 parts per hundred of the elastomer. In both of these patented processes, the losses of filler or polymer in the serum were reduced by employing relatively large amounts of polymer in order to combine with and coat the filler particles. In Borg et al., Industrial and Engineering Chemistry, Vol. 38, No. 10, pp. 1013–16, it is found that in preparing a clay-latex masterbatch having less than 50 percent by weight of clay, retention of the clay by the rubber was increased, although complete retention was not achieved, by increasing the solids content of the clay-latex mixture prior to coagulation.

None of the suggested methods for reducing the losses of filler material or polymer in the serum which resulted from the prior art latex masterbatching processes is satisfactory since they require additional processing steps, and relatively large amounts of polymer are present in the coprecipitated product. It is desirable to obtain a product in which the concentration of compounding ingredient is as great as possible, first, since the polymer latex used to prepare the coprecitated product may not have the same composition as the rubber or plastic stock into which the ingredients ultimately are to be added and the amount of "impurity" introduced into the stock should be kept at a minimum, and second, since it is more economical to maintain the concentration of polymer as low as possible in order to lower the cost of the coprecipitated compounding ingredient for a given amount of compounding ingredient which must be added to the stock. U.S. Pat. No. 1,558,688 discloses a process using a high concentration of filler material, but that process was found to produce cloudy serum.

SUMMARY OF THE INVENTION

The drawbacks and limitations of the prior art are alleviated by the present invention. In accordance with the present invention, rubber or plastic compounding chemicals, which are not used to reinforce or dilute rubber or plastic stock, are coprecipitated with a film-forming binder emulsion comprising a latex of a rubber or plastic polymer to form a homogeneous predispersion of the compounding chemical in the binder. It has most unexpectedly been found that upon coagulation of a mixture of compounding chemicals and binder emulsion in accordance with the process of the present invention, the serum produced has optimum clarity and is essentially free of any compounding chemical and binder. Prior to the present invention substantially complete coprecipitation of all of the compounding chemical and all of the polymer binder was unobtainable without the use of coagulation aids or exceptionally high concentrations of coagulant. Predispersed compounding chemicals prepared according to the invention disclosed herein can be used to rapidly, uniformly and thoroughly disperse the compounding chemical into a rubber or plastic stock by mechanically mixing the predispersed compounding chemical composition with the stock.

In order to coprecipitate the mixture of compounding chemical and film-forming binder emulsion so that the serum produced upon coagulation possesses optimum clarity, it has unexpectedly been found that the amount of binder that is mixed with the compounding chemical should be decreased rather than increased as had been done in the prior art. The predispersed product should comprise greater than about 80 percent by weight of the compounding chemical. The predispersed compositions prepared in accordance with the present process may additionally contain rubber process or extender oils or chemical plasticizers, as well as antidegradants or stabilizers to extend the shelf life of the product.

It has also been found that those compounding chemicals, which can be prepared as the water insoluble reaction products of two water soluble reactants, can be prepared in situ and coprecipitated with a binder emulsion simultaneously in accordance with the present invention by mixing a water soluble salt containing the organic portion of the desired chemical with the film-forming binder emulsion and adding a sufficient amount of the desired metal cation to form the desired chemical and to coagulate the binder emulsion.

Predispersed chemical compositions made in accordance with the present invention are homogeneous, essentially non-tacky, dustless, friable particles that can be accurately weighed and that can be rapidly, uniformly and thoroughly dispersed into rubber or plastic stock with which they are mixed.

BRIEF DESCRIPTION OF THE DRAWINGS

FIG. 1 is a plot of serum absorbance versus weight percent of zinc oxide in predispersed chemical compositions.

FIG. 2 is a plot of serum absorbance versus weight percent of zinc oxide in predispersed chemical compositions.

DESCRIPTION OF THE PREFERRED EMBODIMENTS

Figure 4:
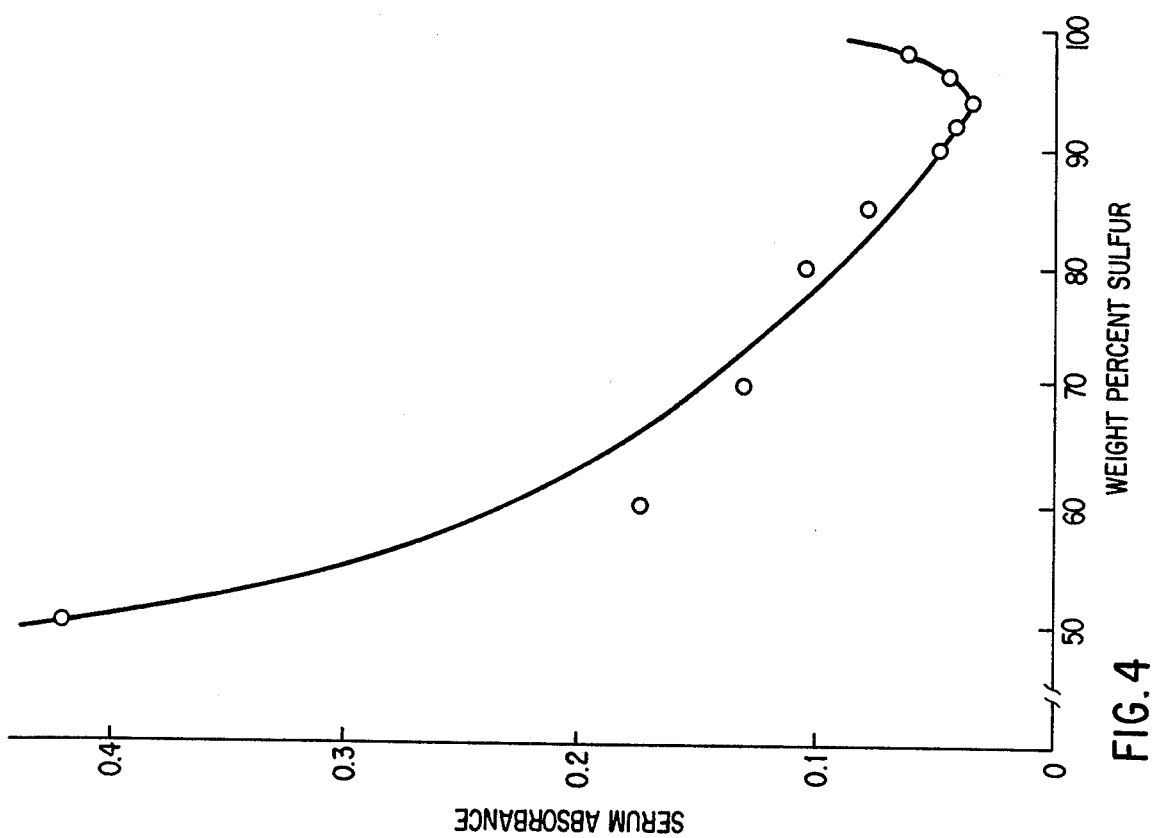
FIG. 4 is a plot of serum absorbance versus weight percent of sulfur in predispersed chemical compositions.

In accordance with the present invention, a mixture of rubber or plastic compounding chemical and a film-forming binder emulsion comprising a latex of a rubber or plastic polymer, and optionally, such ingredients as plasticizers, antidegradants and stabilizers, is coprecipitated to form a homogeneous predispersed chemical and a clear serum essentially free of any compounding chemical and polymer particles.

A large variety of rubber or plastic compounding chemicals are suitable for use in the present invention. Suitable chemicals include all water insoluble chemicals used in formulating rubber or plastic compounds, such as cross-linking agents, curing agents, activators, accelerators, antidegradants, antioxidants, antiozonants, chemical and heat stabilizers, vulcanizing agents, blowing agents, blowing agent activators, retardants, flame retardants, cure modifiers, pigments, and the like which are generally available in finely divided powder form. Examples of typical compounding chemicals which are suitable include cross-linking agents, such as sulfur, dicumyl peroxide, $\alpha,\alpha'$-bis(t-butyl-peroxy)diisopropylbenzene, dibenzoyl-p-quinone dioxime, paraquinone dioxime, 4,4'-dithiodimorpholine; activators, such as zinc oxide, cadmium oxide, lead oxide, red lead, litharge, lead silicate; accelerators, such as N,N'-diphenylthiourea, diethylthiourea, dibutylthiourea, ethylenethiourea, zinc dimethyldithiocarbamate, zinc diethyldithiocarbamate, zinc dibenzyldithiocarbamate, tellurium diethyldithiocarbamate, cadmium diethyldithiocarbamate, copper dimethyldithiocarbamate, lead dimethyldithiocarbamate, bismuth dimethyldithiocarbamate, tetramethylthiuram monosulfide, tetramethylthiuram disulfide, dipentamethylenethiuram hexasulfide, N-1-butyl-2-benzothiazylsulfenamide, N-cyclohexyl-2-benzothiazylsulfenamide, N-oxydiethylene-2-benzothiazylsulfenamide, mercaptobenzothiazole, zinc benzothiazylsulfide, benzothiazyldisulfide, di-ortho-tolylguanidine salt of dicathechol borate, tetrachloro-para-benzoquinone, di-ortho-tolylguanidines; blowing agents, such as azodicarbonamide, p,p'-oxybis-(benzenesulfonyl hydrazide), dinitrosopentamethylene tetramines (DNPT); antioxidants and antiozonants, such as 1,2-dihydro-2,2,4-trimethyl quinoline, 2,4-trimethylquinoline, p-(poly-sulfonylamido)-diphenyl amine, nickel dibutyldithiocarbamate, 4,4'-butylidene-bis-(6-t-butyl-m-cresol), N-phenyl beta naphthylamine; inorganic pigments, such as white-titanium dioxide; flame retardants, such as antimony oxide, halogenated resins, and chlorinated aliphatics; stabilizers, such as dibasic lead phosphite, dibasic lead phthalate, tribasic lead sulfate and the like.

Easily hydrolyzed rubber and plastics compounding chemicals can be used in the present process by coagulating the binder system with polyvalent metal ions such as zinc, calcium, magnesium, aluminum and the like, in order to maintain the pH near neutral during coprecipitation. Where pH is not a critical factor, any mineral acid such as nitric, sulfuric, hydrochloric, acetic and the like can be used to coagulate the binder emulsion.

The chemicals to be coprecipitated with the binder system in accordance with the present process can be added to the film-forming binder emulsion either directly as finely divided dry powder or as an aqueous suspension. Aqueous suspensions of the chemical can be prepared in any of the usual methods, such as simple agitation of the dry powder in water either with stirrers, homogenizers, pipeline mixers, three-roll paint mills, colloid mills or ultrasonics, or by wet grinding a filter cake of the chemical using a ball mill, Attritor, pipeline mixer or three-roll paint mill. If the particle size is sufficiently small, i.e., less than about 250 microns, and preferably less than about 50 microns, the wet filter cake of the chemical can be used directly. Alternatively, the chemical can be prepared in situ and coprecipitated with the binder emulsion simultaneously in accordance with a further embodiment of the present invention. Regardless of which method is used to prepare the finely divided chemical for use in the present invention, the particle size is desirably less than 250 microns, and preferably less than 50 microns, in order to insure the homogeneity of the predispersed chemical composition.

It has been found that clear serum is not produced upon coprecipitation of high concentrations of these compounding chemicals unless the size of substantially all of the particles of chemical is greater than about 0.05 micron. The greater the amount of particles below this size which approach colloidal size the greater the chances that hazy serum will be produced upon coprecipitation. For example, clear serum does not result upon coprecipitation of very finely divided, high surface area materials used to reinforce or dilute rubber or plastic stock, such as carbon black, silica or clay, but rather, a cloudy serum is produced. This may be due to the inability of a relatively small amount of polymer to adequately cover the surfaces of each of the particles having such high surface areas. These materials are not contemplated by the present invention since such very finely divided materials are used in large amounts to reinforce or dilute the rubber or plastic stock and since predispersions containing high concentrations of these materials cannot generally be prepared. When such predispersions are prepared a cloudy serum results. Rather, suitable chemicals which can be used to prepare homogeneous predispersions containing high concentrations of chemical and clear serum are generally those chemicals which must be added in certain critical proportions so that the desired processing conditions or physical properties of the finished or manufactured product are uniformly reproducible. Such chemicals are added in relatively small amounts, generally in the range of 0.1 to 5 percent by weight of the final compound, although occasionally as high as 20 percent by weight. Small variations in the amount, distribution or dispersion of these chemicals in the final compound will cause serious variations in the processing and/or physical properties of the final compound. In accordance with the present invention predispersions of such compounding chemicals can be prepared at high concentrations of chemical which unexpectedly produce a serum essentially free of chemical and polymer particles upon coagulation.

The composition of the binder emulsion containing a polymer latex which is mixed with the compounding chemical is not limited by the process of the present invention, but is only limited by the end use of the product. It is important, however, that the binder emulsion used to prepare the binder of the present invention be capable of forming a film upon evaporation thereof. If some of the latex of a polymer which is being considered for use in the binder emulsion is placed in a glass dish and allowed to evaporate and upon evaporation it forms a homogeneous dry film, then that polymer latex is suitable for use as all or part of a binder emulsion in the present invention. If, however, upon evaporation the latex forms discrete particles of dry polymer, that latex would not be suitble as the sole component of a binder emulsion. A polymer latex which is not film-forming upon evaporation may still be suitable for use as a component in a binder emulsion if the latex can be mixed with an emulsion of a plasticizer for that polymer to form an emulsion which is film-forming upon evaporation. Only a polymer latex which when mixed with an emulsion of a plasticizer for that polymer does not yield a film-forming emulsion is unsuitable for use in the binder emulsions of the present invention. The polymer can be any of the elastomers and plastics (1) that can be found naturally, such as natural rubber, (2) that are commonly prepared by the emulsion polymerization process including, for example, polybutadiene, copolymers of butadiene and one or more comonomers, such as styrene, acrylonitrile, methylmethacrylate, vinylpyridine, or a derivative of it and a carboxylic acid, e.g. styrene-butadiene copolymer (SBR), acrylonitrile-butadiene copolymer, vinylpyridine-styrene-butadiene copolymer; polymers of substituted butadiene, e.g., polychloroprenes; copolymers of vinyl acetate and ethylene; poly(vinyl chloride); poly(vinyl chloride-vinylidene chloride); poly(vinylidene chloride); and acrylonitrile-butadiene-styrene copolymer (ABS), and (3) that are produced by a solution polymerization process and can be converted to emulsion form, usually by emulsifying an organic solution of the polymer with an aqueous soap solution and then driving off the organic solvent. Examples of such polymers include EPDM, EPR, oxidized polyethylene, polyisobutylene, butyl rubber, polyisoprene, and the solution prepared block copolymers of styrene and butadiene sold under the trade names of Kraton and Solprene Plastomers and materials identified as thermoplastic rubbers (TPR). The polymer latex is preferably stabilized anionically for ease of destabilization with acids, polyvalent metal ions, and cationic polyamine solutions, although cationically stabilized latices can also be advantageously employed.

The binder emulsion may additionally contain antidegradants or stabilizers to extend the shelf life of the predispersed chemical produced, or plasticizers. Suitable plasticizers include any material employed for that purpose by the rubber or plastics industries. Examples of suitable plasticizers include aromatic, naphthenic and paraffinic oils, paraffins, waxes, phthalate esters, esters of adipic, azelaic and sebacic acids, di-2-ehtylhexylphthalate, dioctyl phthalate (DOP), tricresyl phosphate (TCP), and other organic phosphates, and glycoldicarboxylic acid polyesters. These plasticizers are preferably emulsified before blending with the latex, although with suitable equipment, they can be emulsified directly into the latex.

The concentration of plasticizer in the binder is a function of the molecular weight of the polymer employed, the particle size and the specific gravity of the chemical to be dispersed, the nature of the chemical to be dispersed, e.g. polar or nonpolar, and the end use of the rubber or plastic stock into which products of the present invention ultimately are to be dispersed. In some formulations, no plasticizer will be required and the binder will be essentially all polymer. For example, the product formed by the coprecipitation of a nonpolar chemical such as sulfur is quite satisfactory when prepared with an all polymer binder. The properties of a predispersion of finely divided zinc oxide, however, are enhanced by the use of extender oils in the the binder system which have the effect of lowering the average molecular weight of the binder system thereby providing greater ability of the binder to form a homogeneous predispersion. Instead of using plasticizer to lower the average molecular weight of the binder, a polymer having a lower molecular weight could be employed as the binder. The upper limit on the amount of plasticizer used in the binder system depends upon the particular chemical to be dispersed. This amount should not exceed 98 percent by weight of the binder, however, since higher concentrations of plasticizer, and thus lower concentrations of polymer, do not impart enough "body" to the binder system, causing it to become sticky and hard to handle. At the upper limit, the composition of an oiled chemical product is approached which does not have the physical form or the dispersability characteristics of the present product. It will be appreciated by those skilled in the art that the binder system must be compatible with the stock into which it is to be mixed. The hardness and Mooney viscosity of the binder must also be compatible with those of the stock. If the differences in Mooney viscosities and hardness values between the binder and the stock are too great, incomplete dispersion will occur resulting in a decrease in the physical properties of the cured final product.

The relative proportions of the compounding chemicals and the binder in the predispersed chemical compositions of the present invention vary over a relatively narrow range. The predispersed chemical compositions should comprise from about 80 to about 99.5 percent by weight, and preferably, from about 85 to about 95 percent by weight of compounding chemical. It has unexpectedly been found that serum having optimum clarity is obtained when the concentration of the compounding chemical is greater than about 80 percent by weight. The concentration of chemical selected to produce a homogeneous predispersion and substantially clear serum will depend on the physical and chemical nature of the particular chemical to be dispersed. For example, chemicals with a large surface area and low specific gravity will require a greater concentration of binder than those with a smaller surface area and higher specific gravity. The chemical portion of the composition can be either a single compounding chemical or a mixture of chemicals. The total chemical content, however, should be maintained within the limits set forth above.

Predispersed compounding chemicals are prepared in accordance with the following procedure. Initially, the polymer latex, the compounding chemical or mixture of chemicals, and any ingredients optionally included which are preferably in emulsion form are intimately mixed. Although the order of addition has not been found to affect the final product, the degree of intimacy is affected by the efficiency of the mixing. A good predispersed chemical can be obtained by simply mixing the ingredients mechanically with a normal blade or paddle stirrer. It has been found, however, that the clarity of the serum produced depends upon the degree of intimacy of the mixing. It is important that the particles of compounding chemical be intimately mixed with the particles of binder in the emulsion so that the twin scavenging effect referred to hereinafter can ensue. If the particles of chemical and binder are not intimately mixed, then substantially clear serum will not be produced upon coagulation. Consequently, the particles of chemical and binder should be mixed in any of the well-known intimate mixers, such as a Waring Blender, homogenizer, and the like. It has also been found that the amount of water in the aqueous phase of the polymer latex and in the aqueous phase of the plasticizer emulsion where employed may not be adequate to permit the particles of chemical to be intimately mixed with the binder particles even with the use of an intimate mixer, such as a Waring Blender. As a result, the serum produced upon coagulation will not be substantially clear. Thus, it may be necessary to add dilution water to the mixture so that intimate mixing thereof can be effected. However, if too much water is added and the mixture becomes too dilute, the particles of chemical will be separated from and unable to contact particles of binder so that the twin scavenging will not be able to occur and the serum produced will not be clear. Therefore, where additional water is required, only a sufficient amount of water should be added to permit intimate mixture of the particles of chemical and binder. Conversely, if it is found that clear serum is not produced because the binder emulsion is too dilute even though no dilution water has been added, it may be necessary to remove some of the aqueous phase of the emulsion by any well-known method.

Coagulation of the intimate mixture is carried out under agitation using any of the well-known coagulants, depending upon the type of stabilization. Typical coagulating agents for anionically stabilized emulsions include mineral acids, strong organic acids and polyvalent metal ions. Cationically stabilized emulsions can be coagulated with large anions such as phosphates and borates. It is important that the coagulant which is added be intimately mixed with the intimate mixture of particles of chemical and binder, since the coagulant cannot destabilize emulsified particles which it does not contact. Moreover, if a sufficient amount of coagulant is not added to the mixture it will not be completely coagulated. Therefore, in order to obtain substantially clear serum upon coagulation, it is important that there be sufficient coagulant added to destabilize all of the binder particles and that there be sufficient agitation during addition of the coagulant so that each of the particles will be contacted by the coagulant. It has been found, moreover, that the improvement in serum clarity observed at high concentrations of compounding chemical discussed hereinafter is relatively independent of coagulant concentration. Thus, at high chemical concentrations not only is less binder needed but the coagulant is used more efficiently.

The amount of agitation, the dilution of the mixture, the nature and molecular weight of the polymer used, the amount of plasticizer used and the particle size, surface area and specific gravity of the compounding chemical will all have a direct effect on the particle size of the predispersed chemical composition. Following coagulation of the mixture, the serum is physically separated from the predispersed chemical. Wash water is added which is then filtered or decanted off. Finally, the predispersed chemical composition is dried by suitable means, such as a forced air oven, partial vacuum evaporation and the like.

It is also possible to add the compounding chemical to the binder ingredients prior to coagulation in the form of wet filtercakes of the chemical. The fine particle size of the wet filtercakes provides good dispersion of the chemical in the binder emulsion upon gentle stirring and results in the production of an excellent predispersed chemical product. The use of wet filtercakes in the present process eliminates the dry grinding and handling of finely divided dry powders and removes the attendant health hazards. If the particle size of the wet filtercake is too large to produce a good dispersion, the filtercake can be wet ground to the desired particle size.

In a further embodiment of the present process, the compounding chemical can be prepared in situ and coprecipitated with the binder emulsion simultaneously, thus bypassing the wet filtercake step and avoiding any problem with particle size being too large. Many compounding chemicals can be prepared as the water insoluble reaction products of two water soluble reactants. Such chemicals can be prepared in situ during the present coprecipitation process by mixing a water soluble salt containing the organic portion of the desired chemical with the binder emulsion and adding a sufficient amount of a water soluble salt containing the desired metal cation thereby forming the desired chemical and simultaneously coagulating the emulsion. For example, a solution of sodium dimethyldithiocarbamate can be mixed with a polymer latex and a solution of a soluble zinc salt, such as zinc sulfate, can be added to the mixture. The amount of zinc present in the mixture should be sufficient to quantitatively react with the sodium dimethyldithiocarbamate to form the compounding chemical zinc dimethyldithiocarbamate, to coagulate the binder emulsion, and to provide a slight excess. Because preparation of the compounding chemical in situ disperses the chemical immediately before it has an opportunity to agglomerate, the particle size is greatly reduced from that found in a wet filtercake and is within the size range contemplated for the practice of the present invention. It is possible, however, that in preparing certain chemicals the dispersion and coprecipitation will occur so rapidly that the particle size will be less than that desired. If this happens, the serum produced will be cloudy. This can easily be remedied so that the chemical can be coprecipitated in accordance with the present process. Chemicals which suitably can be prepared and predispersed in situ in accordance with the present invention include the dithiocarbamates, such as zinc dimethyldithiocarbamate, zinc diethyldithiocarbamate and copper dimethyldithiocarbamate, the thiazoles, such as zinc benzothiazylsulfide, and the xanthates, such as zinc isobutylxanthate. It is also believed that such compounds as the thiurams and the sulfenamides can be prepared and predispersed in situ by coordinating the appropriate chemical and coagulation reactions.

One of the most remarkable aspects of the present invention is the fact that the serum produced upon coprecipitation of the compounding chemical and the binder actually becomes clearer as the concentration of the chemical increases until it reaches a point of optimum clarity within the range of about 80 to about 99.5 percent by weight of chemical. Prior to the present invention any losses due to the presence of particles of either filler material or binder in the serum were reduced by the addition of more binder, not more filler, since it was apparently believed that there was not sufficient binder to hold all of the particles in the masterbatch. It was quite unexpected, therefore, to find that the presence of high concentrations of chemical in the binder emulsion mixture resulted in substantially clear serum upon coagulation. The clear serum which is observed is believed to be the result of what might be referred to as a twin scavenging effect. The compounding chemical scavenges the excess binder particles in the emulsion and the binder particles scavenge the excess, although higher concentration of, compounding chemical. When the compounding chemical is present in high concentration, it actually functions as a coagulation aid during coprecipitation, although it remains inactive insofar as its intended function, such as that of a vulcanizing agent, is concerned until the rubber or plastic stock into which the predispersed chemical is added is subsequently treated.

The clarity of the serum can be observed by coprecipitating a compounding chemical and binder as described herein and then mechanically separating the serum from the predispersed chemical produced. Mechanical separation can be achieved by any well-known means such as by filtration through a screen or filter paper. Care must be taken to select a separation means having an opening or pore size which accurately separates the predispersed chemical product from the serum and any free particles of chemical or binder present in the serum. If the opening size is too small, then even the smallest particles will be separated from the serum and it will incorrectly be observed to be perfectly clear. If, on the other hand, the opening size is too large, then the small particles of predispersed chemical product will not be separated from the serum and it may incorrectly be observed to be cloudy. However, if the appropriate opening size is selected, accurate measurements can be made of the serum clarity. Following separation, the clarity of the serum can be observed using a suitable means such as a spectrophotometer to measure absorbance. It has been found, for example, that serum absorbance measured on a Bausch & Lomb Spectronic 20 at 600 mu varies from perfectly clear at 0.0 to hazy or unclear at 0.1. Serums having absorbance values of below about 0.04 appear substantially clear to the naked eye. As the absorbance increases above those values, substantially clear serum gradually becomes less clear until the absorbance reaches a value of 0.1 at which point the serum is considered to be unclear.

When the clarity is measured for various serums resulting from the coprecipitation of several mixtures of compounding chemical and binder emulsion at various concentrations of chemical, it will be observed that the optimum clarity is obtained within the range of chemical concentration contemplated by the present invention. The serum is less clear as the concentration of chemical is decreased. This is due predominantly to the presence of minute particles of binder suspended in the serum. As the concentration of chemical is increased above the optimum point of clarity, the serum again becomes less clear, due predominantly to the presence of unbound particles of chemical suspended in the serum. It will be appreciated by those skilled in the art that in order to minimize the loss of chemical and binder in the serum and to reduce pollution due to the presence of chemical or binder in the serum when it is discarded, the serum clarity should be maintained substantially equal to the optimum.

Another unexpected property of predispersed chemical compositions produced in accordance with the present invention is their ease of incorporation into a rubber or plastic stock. It has been found that generally as the concentration of chemical in the predispersed product is increased, the time required for complete dispersion into a rubber or plastic stock is decreased until a point is reached within the range of concentrations suitable for obtaining optimum serum clarity where the incorporation time begins to increase. It was expected that the more binder the predispersion contained, the more like the stock the predispersion became and the more rapid would be the incorporation. It was also expected that the more chemical the predispersion contained, the more like the dry powder chemical the predispersion became and the incorporation time would slow down to that observed with dry powder. It was found, however, that the incorporation time for complete dispersion of the predispersed chemical composition was less at chemical concentrations greater than about 80 percent by weight than the incorporation times for predispersions containing more binder or for the dry powdered chemical.

The predispersed chemical compositions prepared in accordance with the present invention are in the form of dustless, friable particles. Such particulated material lends itself to accurate weighing and is suitable for use in automatic measuring systems, mechanical blending and continuous extrusion molding. Moreover, all of the problems normally associated with the handling of these chemicals in dry powdered form are eliminated. Due to the excellent coverage of each particle of chemical by binder obtained with this process, the chemical is essentially encapsulated and shielded from moisture and oxygen in the air. Thus, the activity of moisture and air sensitive chemicals is maintained for longer periods of time. The coverage by the binder also eliminates dust and greatly reduces odor from the chemical. The finely dispersed nature of the predispersed chemical results in less clustering, and consequently, more efficient use of the chemical. The elimination of dust, fast incorporation, elimination of drop-through on the mill, accuracy of weighing, and assured chemical activity insures consistent vulcanizate properties from batch to batch.

There are certain combinations of solid rubber compounding chemicals which, when mixed together under moderate temperatures, form low melting eutectic mixtures. The heat of mixing on a mill or in a Banbury is sufficient to produce this liquid eutectic that tends to soften the binder and inhibit further mixing. This problem can be overcome by using a larger amount of binder. However, it is considered desirable to use as little binder as possible while still maintaining processibility. No additional binder need be added if the present coprecipitation process is used since low temperatures are employed which never reach the melting point of the eutectic.

The high reactivities and relatively low melting points of the organic peroxides make the mechanical blending of large amounts of these chemicals with an elastomeric binder quite hazardous. A practical upper limit on the concentration of a mechanically prepared peroxide predispersion is about 40 percent by weight. The coprecipitation process described herein permits the preparation of compositions containing high concentrations of peroxide because of the low energy and temperature employed. Flash or vacuum drying can be used to reduce the heat history of the product even further. Thus, little peroxide is lost by thermal decomposition during preparation of this predispersion by this method.

Blowing agents such as azodicarbonamide, p,p'-oxybis (benzenesulfonyl hydrazide), and dinitrosopentamethylene tetramines are difficult to mechanically blend with binders at high chemical concentrations because of their relatively low decomposition temperatures. It has been found, however, that high concentrations of these blowing agents can be coprecipitated according to the present process due to its very low heat history. The heat history of any predispersed chemical compositions made in accordance with the present process can be kept to an absolute minimum by mixing all of the ingredients cold and flash, vacuum or freeze drying the predispersed product.

A more complete appreciation of the invention will be realized by reference to the following specific examples and to the figures which relate to specific compounding chemicals, binder compositions, and methods of preparing predispersed chemical compositions. In each of these examples, one of the following three standard coagulation solutions was employed unless otherwise indicated. The sulfuric acid coagulation solution was prepared by diluting 22.4 g. of concentrated sulfuric acid (98%) with one gallon of water, the zinc sulfate coagulation solution was prepared by dissolving 64.5 g. of zinc sulfate heptahydrate in one gallon of water, and the magnesium sulfate coagulation solution was prepared by dissolving 64.5 g. of Epsom salts in one gallon of water. The following examples are not intended to limit the invention disclosed herein except to the extent that limitations are specifically stated or to the extent to which limitations appear in the appended claims.

EXAMPLE 1

Several predispersed chemical compositions comprising different concentrations of chemical and binder were prepared in accordance with the procedures set forth herein and the serums produced upon coprecipitation thereof were observed as to their clarity.

Seven predispersed chemical compositions of zinc oxide (42/21, St. Joe Minerals Corp.) and a copolymer of styrene and butadiene (1500 Type SBR, 19.8%TS Copolymer Rubber & Chemical Corp.) were prepared which contained 50, 60, 70, 80, 85, 90 and 92 percent by weight of zinc oxide using the following procedure. Since it was recognized that the amount of water used in the process would directly affect the quality of the product and influence the concentration of suspended solids in the serum, the total amount of water used in a given series should be held as nearly constant as possible. The total amount of water includes the aqueous phase of the latex, the aqueous phase of the plasticizer emulsion where employed, the dilution water, and any water used to rinse down the sides of the blender after each operation.

The total amount of water used in the present series was 160 ml. which was the amount required to adequately cover the blades of a one-quart capacity Waring Blender. The water used to rinse down the sides of the blender jar between the various operations was kept constant from batch to batch by placing 50 ml. of water in a plastic squeeze bottle and using only this amount for a given batch. Preferably, less water should be used from a technical as well as commercial standpoint.

Initially, the dilution water is added to the Waring Blender. The amount of dilution water required is equal to 160 ml. minus the volume of water calculated to be in the various emulsions used to prepare a particular predispersed chemical composition.

An appropriate amount of chemical to be predispersed by the process is then weighed to two decimal places using a top loading Mettler Balance Model P1210 and transferred to the Waring Blender jar. Alternatively, the chemical can be weighed directly into the blender jar. Since zinc oxide is polar and easily wetted by water, the binder emulsion could be added to the blender jar prior to addition of the zinc oxide. For non-polar hydrophobic chemicals which do not disperse easily it was found to be advantageous to add the chemical to the dilution water, agitate until the chemical was deagglomerated and wetted, and then add the binder emulsion. If the binder emulsions are added prior to the addition of the hydrophobic chemicals, the amount of agitation required to produce a homogeneous mixture causes mechanical destabilization of the binder emulsions resulting in the intermediate formation of chemical agglomerates bound together with mechanically precoagulated binder. This intermediate product does not form a homogeneous mixture with the remainder of the dilute latex. Surfactants such as fatty acid soaps may be added to the dilution water to facilitate wetting of the hydrophobic chemicals.

Following addition of the chemical to the dilution water, the mixture is agitated for a given length of time. Although the actual mixing time is a function of the wettability of the chemical, it should be kept constant for a given chemical throughout a given series of runs. Three minutes has generally been found to be a suitable length of time. Small amounts of the water in the squeeze bottle may be used periodically during agitation to wash chemical from the sides of the blender jar.

After agitation of the hydrophobic chemical and water, the appropriate amount of the binder constituent emulsions are added to the jar. A small amount of water from the squeeze bottle should be used to quantitatively transfer the binder emulsions to the blender jar. The resulting mixture is agitated for about 10 seconds and then the appropriate amount of coagulating solution is added to the mixture during further agitation thereof. Different coagulating solutions are used depending upon the particular chemical being dispersed. In this case the standard zinc sulfate coagulation solution was used.

The mixture is agitated for an additional 60 seconds following addition of the coagulating solution. The remaining water in the squeeze bottle is used to wash down the sides of the blender to insure complete coagulation.

Immediately following agitation in the blender, the mixture was poured through a stainless steel screen. Since the particle size becomes increasingly smaller and approaches the particle size of the untreated chemical as the quantity of binder used decreases and becomes insufficient to adequately coat and bond together the particles of chemical, a screen having mesh size approximately that of the largest particles of chemical practically suitable for commercial usage, i.e., about 250 microns or 60 mesh, was chosen to separate the predispersed chemical composition from the serum. Generally, the lack of clarity observed at low concentrations of chemical in the predispersion is due predominantly to the presence of minute suspended particles of polymer in the serum, and the lack of clarity at high concentrations of chemical is due predominantly to particles of unbound chemical in the serum. A portion of the filtered serum is then poured into a special test tube for use in a Bausch & Lomb Spectronic 20 spectrophotometer. The serum absorbance at 600 mu is then measured using the spectrophotometer.

The above procedure was repeated for each of the seven concentrations of zinc oxide and SBR binder. The data obtained is set forth in Table I below:

TABLE I

| Weight Percent Zinc Oxide | Weight Zinc Oxide (grams) | Weight SBR Latex (grams) | Dilution Water (ml.) | Coagulant (ml.) | Serum Absorbance |
| --- | --- | --- | --- | --- | --- |
| 50 | 12.5 | 63.1 | 110 | 46.8 | 0.83 |

TABLE I-continued

| Weight Percent Zinc Oxide | Weight Zinc Oxide (grams) | Weight SBR Latex (grams) | Dilution Water (ml.) | Coagulant (ml.) | Serum Absorbance |
|---|---|---|---|---|---|
| 60 | 15 | 50.5 | 120 | 45 | 0.39 |
| 70 | 17.5 | 37.9 | 130 | 33.8 | 0.29 |
| 80 | 20 | 25.3 | 140 | 32.5 | 0.08 |
| 85 | 21.3 | 18.9 | 145 | 16.7 | 0.02 |
| 90 | 22.5 | 12.7 | 150 | 12.5 | 0.80 |
| 92 | 23 | 10.1 | 152 | 9 | ∞ |

A plot of this data is shown in FIG. 1. Referring to FIG. 1 it can be seen that the serum produced upon coagulation of the mixtures of zinc oxide and SBR latex was substantially clear and at its optimum clarity when the predispersed chemical composition comprised about 85 percent by weight of zinc oxide and about 15 percent by weight of SBR.

EXAMPLE 2

Using the procedure set forth in Example 1 above, eight predispersed chemical compositions were prepared which contained 50, 60, 70, 80, 85, 88, 93 and 96 percent by weight of zinc oxide (42/21, St. Joe Minerals Corp.) and a binder of a styrene-butadiene copolymer (1500 Type SBR, Copolymer Rubber & Chemical Corp.) extended with an aromatic petroleum oil (Sundex 790, Sun Oil Co.). For each run, the appropriate amount of zinc oxide was added to a Waring Blender containing the SBR latex (19.8%TS) the oil emulsion (25%TS) and the dilution water and the mixture was then agitated. During agitation in the blender, an appropriate amount of the zinc sulfate coagulating solution was added to the mixture. Then, the mixture was agitated for an additional 60 seconds, the jar sides were washed with the remaining water in the squeeze bottle, and immediately following agitation the mixture was poured through a 60 mesh stainless steel screen. The absorbance of the filtered serum was measured for each of the eight runs. The data obtained is set forth in Table II below:

TABLE II

| Weight Percent Zinc Oxide | Weight Zinc Oxide (grams) | Weight SBR Latex (grams) | Weight Oil Emulsion (grams) |
|---|---|---|---|
| 50 | 12.5 | 47.35 | 12.5 |
| 60 | 15 | 37.88 | 10 |
| 70 | 17.5 | 28.41 | 7.5 |
| 80 | 20 | 19.57 | 5 |
| 85 | 21.3 | 14.0 | 3.7 |
| 88 | 22.0 | 11.4 | 3 |
| 93 | 23.3 | 6.4 | 1.7 |
| 96 | 24.0 | 3.8 | 1 |

| Weight Percent Zinc Oxide | Dilution Water (ml.) | Coagulant (ml.) | Serum Absorbance |
|---|---|---|---|
| 50 | 113 | 100 | 0.43 |
| 60 | 122 | 90 | 0.21 |
| 70 | 138 | 90 | 0.14 |
| 80 | 145 | 90 | 0.07 |
| 85 | 148 | 12.5 | 0.08 |
| 88 | 150 | 10.1 | 0.23 |
| 93 | 155 | 5.9 | 2.00 |
| 96 | 157 | 3.4 | 2.50 |

A plot of this data is shown in FIG. 2. As can be seen from FIG. 2, the serum produced upon coagulation of the mixtures of zinc oxide, SBR latex and oil emulsion exhibited its optimum clarity and was substantially clear when the predispersed chemical composition comprised about 80 percent by weight of zinc oxide and about 20 percent by weight of binder. Lower values for the serum absorbance could have been obtained for each run by the use of more coagulant throughout the series.

EXAMPLE 3

Using the procedure of Example 1 above, ten predispersed chemical compositions containing 50, 60, 70, 80, 85, 90, 95, 97, 98, and 99 percent by weight of sulfur (RM 99.99) and a copolymer of styrene and butadiene (1500 Type SBR). Since sulfur is a non-polar hydrophobic chemical which does not disperse readily, for each run an appropriate amount was first added to the dilution water in the blender and agitated until it was deagglomerated and wetted. The SBR latex (19.8%TS) was then added to the wetted sulfur and agitated for 10 seconds. The sulfuric acid coagulating solution was then added to the mixtures during further agitation thereof. Following addition of the coagulating solution, the mixtures were agitated for an additional 60 seconds, the blender jar sides were washed down, and the agitated mixtures was immediately filtered through a 60 mesh stainless steel screen. The absorbance of the filtered serum for each of the ten runs was measured and appears in Table III below:

TABLE III

| Weight Percent Sulfur | Weight Sulfur (grams) | Weight SBR Latex (grams) | Dilution Water (ml.) | Coagulant (ml.) | Serum Absorbance |
|---|---|---|---|---|---|
| 50 | 12.5 | 63.1 | 110 | 37.5 | 0.05 |
| 60 | 15.0 | 50.5 | 120 | 30.0 | 0.07 |
| 70 | 17.5 | 37.9 | 130 | 22.5 | 0.10 |
| 80 | 20.0 | 25.3 | 140 | 15.0 | 0.09 |
| 85 | 21.3 | 18.9 | 145 | 11.1 | 0.09 |
| 90 | 22.5 | 12.7 | 150 | 7.5 | 0.07 |
| 95 | 23.75 | 6.31 | 155 | 3.75 | 0.04 |
| 97 | 24.3 | 3.5 | 157 | 2.1 | 0.02 |
| 98 | 24.5 | 2.5 | 158 | 4 | 0.03 |
| 99 | 24.8 | 1.0 | 159 | 3 | 0.05 |
| 100 | 25.0 | — | 160 | 0.00 | 0.70 |

Figure 3:
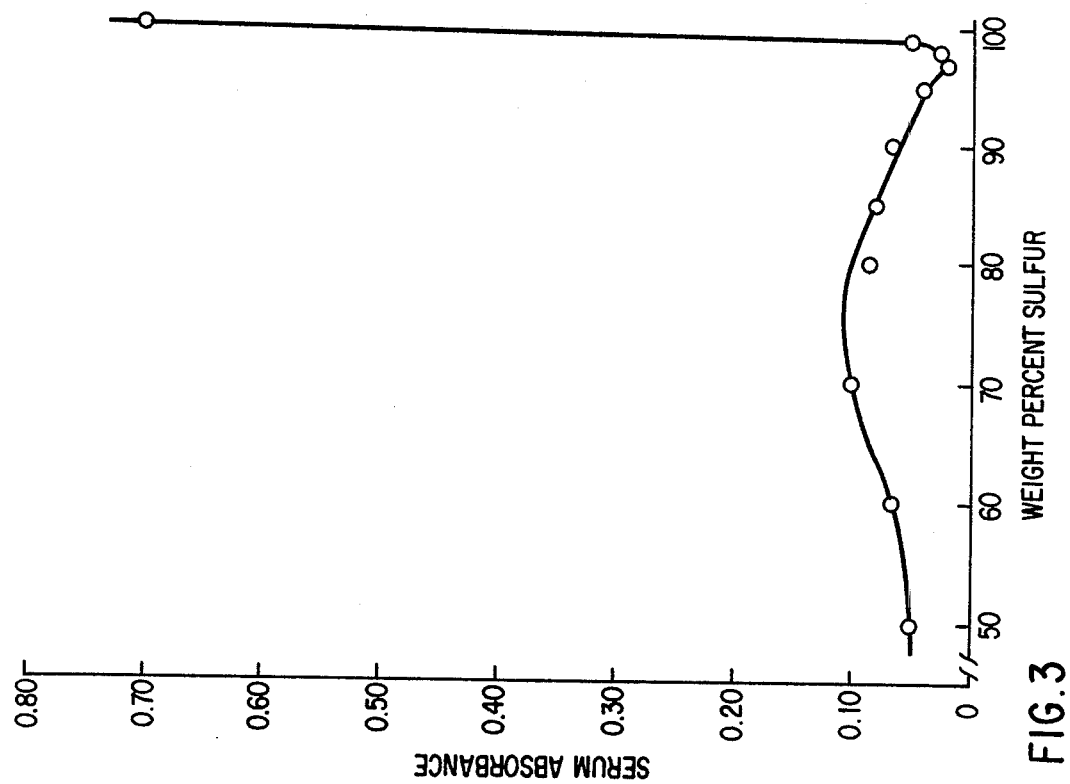
FIG. 3 is a plot of serum absorbance versus weight percent of sulfur in predispersed chemical compositions.

A plot of this data is shown in FIG. 3. It can be seen by referring to FIG. 3 that the serum produced upon coagulation of the mixtures of sulfur and SBR latex exhibited its optimum clarity and was substantially clear when the predispersed chemical composition comprised about 97 percent by weight of sulfur and about 3 percent by weight by SBR.

EXAMPLE 4

Ten predispersed chemical compositions containing 50, 60, 70, 80, 85, 90, 92, 94, 96 and 98 percent by weight of sulfur (RM 99.99) and a binder of a styrene-butadiene copolymer (1500 Type SBR) extended with an aromatic petroleum oil (Sundex 790) were prepared using the procedure set forth in Example 1 above. For each run, the appropriate amount of sulfur was added to the dilution water in the blender and agitated until it was deagglomerated and wetted. The SBR latex (19.8%TS) and the oil emulsion (25%TS) were then added to the wetted sulfur and agitated for 10 seconds. Then the sulfuric acid coagulating solution was added to the mixtures during further agitation thereof. Each mixture was then agitated for an additional 60 seconds, the blender jar sides were washed down and the mixture was immediately filtered through a 60 mesh stainless steel screen. The absorbance of the filtered serum for each of the ten runs was measured. The data obtained is set forth in Table IV below:

TABLE IV

| Weight Percent | Weight Sulfur | Weight SBR Latex | Weight Oil Emulsion |
|---|---|---|---|

TABLE IV-continued

| Sulfur | (grams) | (grams) | (grams) |
|---|---|---|---|
| 50 | 12.5 | 47.35 | 12.5 |
| 60 | 15.0 | 37.88 | 10.0 |
| 70 | 17.5 | 28.41 | 7.5 |
| 80 | 20.0 | 19.51 | 5.0 |
| 85 | 21.25 | 14.21 | 3.75 |
| 90 | 22.5 | 9.47 | 2.50 |
| 92 | 23.0 | 7.58 | 2.0 |
| 94 | 23.5 | 5.68 | 1.5 |
| 96 | 24.0 | 3.79 | 1.0 |
| 98 | 24.5 | 1.89 | 0.5 |

| Weight Percent Sulfur | Dilution Water (ml.) | Coagulant (ml.) | Serum Absorbance |
|---|---|---|---|
| 50 | 113 | 29 | 0.42 |
| 60 | 122 | 23 | 0.175 |
| 70 | 138 | 17 | 0.13 |
| 80 | 145 | 12 | 0.105 |
| 85 | 146 | 9 | 0.080 |
| 90 | 150 | 6 | 0.049 |
| 92 | 152 | 6 | 0.042 |
| 94 | 154 | 6 | 0.035 |
| 96 | 156 | 6 | 0.045 |
| 98 | 158 | 6 | 0.065 |

A plot of this data is shown in FIG. 4. Referring to FIG. 4, it can be seen that the serum produced upon coagulation of the mixtures of sulfur, SBR latex and oil emulsion exhibited its optimum clarity and was substantially clear when the predispersed chemical comprised about 94 percent by weight of sulfur and about 6 percent by weight of binder.

EXAMPLE 5

Eight predispersed chemical compositions containing 50, 60, 70, 80, 85, 90, 95 and 98 percent by weight of ethylene thiourea (NA-22, E. I. duPont deNemours & Co., Inc.) and a polychloroprene (Neoprene 400, du-Pont) were prepared using the procedure of Example 1 above. For each run the appropriate amount of ethylene thiourea was added to a blender containing the polychloroprene latex (50%TS) and agitated. During agitation an appropriate amount of the magnesium sulfate coagulating solution was added to each mixture. Then the mixtures were agitated for an additional 60 seconds, the sides of the jars were washed down, and the agitated mixtures were immediately filtered through a 60 mesh stainless steel screen. The absorbance of the filtered serum for each of the eight runs was measured. The data obtained is set forth in Table V below:

TABLE V

| Weight Percent Chemical | Weight Chemical (grams) | Weight Latex (grams) | Dilution Water (ml.) | Coagulant (ml.) | Serum Absorbance |
|---|---|---|---|---|---|
| 50 | 12.5 | 25 | 148 | 50.0 | 0.08 |
| 60 | 15.0 | 20 | 150 | 40.0 | 0.065 |
| 70 | 17.5 | 15 | 153 | 30.0 | 0.05 |
| 80 | 20.0 | 10 | 155 | 20.0 | 0.025 |
| 85 | 21.3 | 7.4 | 156 | 15.0 | 0.025 |
| 90 | 22.5 | 5.0 | 157 | 10.0 | 0.020 |
| 95 | 23.8 | 2.4 | 159 | 10.0 | 0.04 |
| 98 | 24.5 | 1.0 | 159 | 10.0 | 0.15 |

Figure 5:
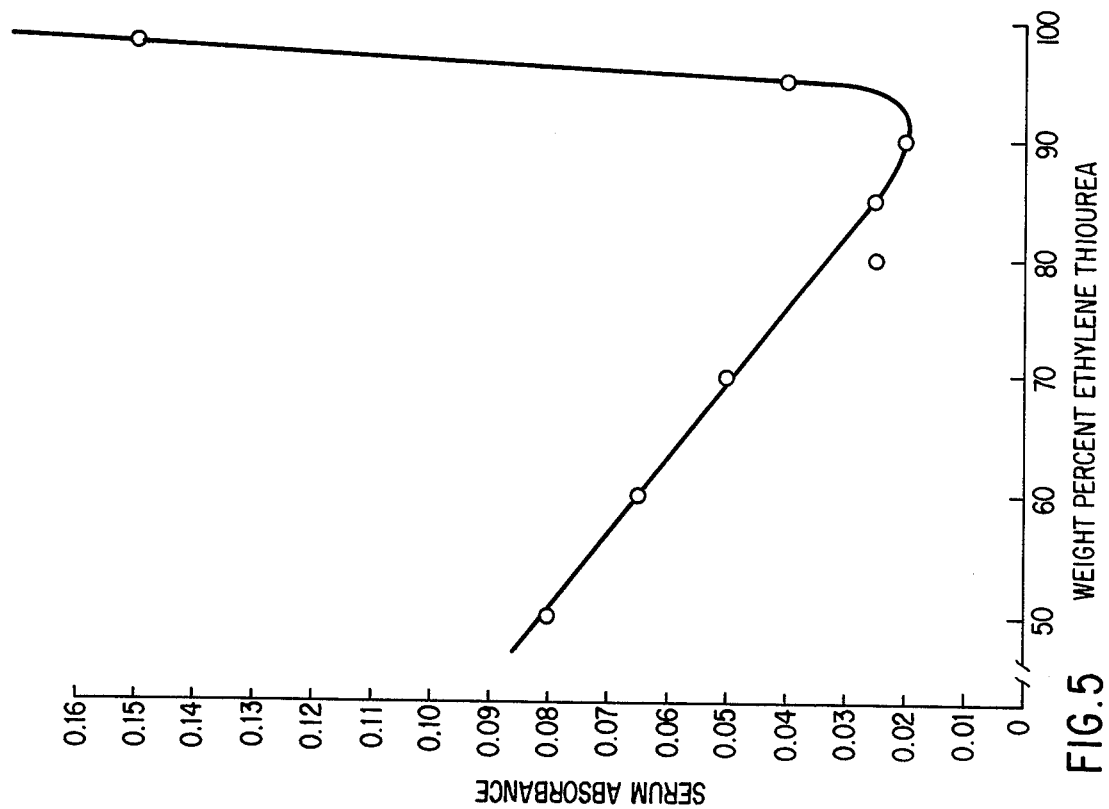
FIG. 5 is a plot of serum absorbance versus weight percent of ethylene thiourea in predispersed chemical compositions.

A plot of this data is shown in FIG. 5. As can be seen from FIG. 5, the serum produced upon coagulation of mixtures of ethylene thiourea and polychloroprene latex exhibited optimum clarity and was substantially clear when the predispersed chemical composition comprised about 90 percent by weight of ethylene thiourea and about 10 percent by weight of polychloroprene.

EXAMPLE 6

Using the procedure set forth in Example 1 above, eight predispersed chemical compositions were prepared which contained 50, 60, 70, 80, 85, 90, 95 and 97.5 percent by weight of ethylene thiourea (NA-22) and a binder of polychloroprene (Neoprene 400) extended with dioctyl phthalate (DOP, Monsanto). For each run the appropriate amount of ethylene thiourea was added to a blender containing the polychloroprene latex (50%TS), and a dioctyl phthalate emulsion (25%TS) and the dilution water and the mixture was agitated. An appropriate amount of the magnesium sulfate coagulating solution was added to each mixture during agitation. The mixtures were then agitated for an additional 60 seconds, the sides of the blender jar were washed down, and immediately following agitation the mixtures were filtered through a 60 mesh stainless steel screen. The absorbance of the filtered serum for each run was then measured. This data appears in Table VI below:

TABLE VI

| Weight Percent Chemical | Weight Chemical (grams) | Weight Latex (grams) | Weight DOP Emulsion (grams) |
|---|---|---|---|
| 50 | 12.5 | 18.76 | 12.5 |
| 60 | 15.0 | 15.00 | 10.0 |
| 70 | 17.5 | 11.26 | 7.5 |
| 80 | 20.0 | 7.76 | 5.0 |
| 85 | 21.25 | 5.62 | 3.75 |
| 90 | 22.5 | 3.75 | 2.50 |
| 95 | 23.75 | 1.88 | 1.25 |
| 97.5 | 24.38 | 0.94 | 0.625 |

| Weight Percent Chemical | Dilution Water (ml.) | Coagulant (ml.) | Serum Absorbance |
|---|---|---|---|
| 50 | 142 | 50 | 0.34 |
| 60 | 145 | 40 | 0.17 |
| 70 | 148 | 30 | 0.15 |
| 80 | 152 | 20 | 0.035 |
| 85 | 153 | 15 | 0.041 |
| 90 | 156 | 10 | 0.019 |
| 95 | 158 | 10 | 0.035 |
| 97.5 | 159 | 10 | 0.080 |

Figure 6:
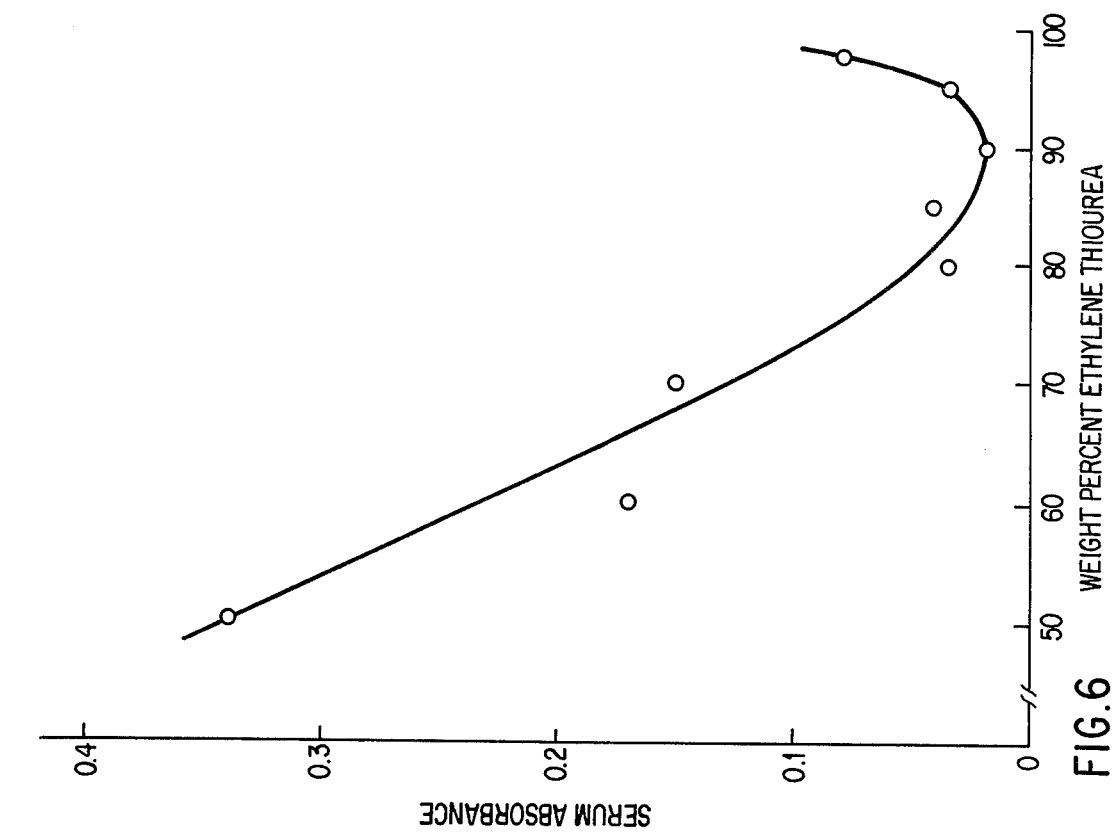
FIG. 6 is a plot of serum absorbance versus weight percent of ethylene thiourea in predispersed chemical compositions.

A plot of this data is shown in FIG. 6. Referring to FIG. 6, it can be seen that the serum produced upon coagulation of mixtures of ethylene thiourea, polychloroprene latex, and dioctyl phthalate emulsion exhibited optimum clarity and was substantially clear when the predispersed chemical composition comprised about 90 percent by weight of ethylene thiourea and about 10 percent by weight of binder.

EXAMPLE 7

Ten predispersed chemical compositions containing 50, 60, 70, 80, 85, 87.5, 90, 92.5, 95 and 97.5 percent tetramethylthiuram disulfide (TUEX, Uniroyal) and a copolymer of styrene and butadiene (1500 Type SBR) were prepared using the procedure set forth in Example 1 above. Appropriate amounts of tetramethylthiuram disulfide were added to blenders containing SBR latex (19.8%TS) and agitated. During agitation, appropriate amounts of the magnesium sulfate coagulating solution were added. Following addition of the coagulating solution, the mixtures were agitated for an additional 60 seconds and the jar sides were washed down. The agitated mixtures were immediately filtered through a 60 mesh stainless steel screen. The absorbance of the filtered serum of each of the runs was measured and the data appears in Table VII below:

TABLE VII

| Weight Percent Chemical | Weight Chemical (grams) | Weight Latex (grams) | Dilution Water (ml.) | Coagulant (ml.) | Serum Absorbance |
|---|---|---|---|---|---|
| 50 | 12.5 | 63.1 | 110 | 67.5 | 0.04 |
| 60 | 15 | 50.5 | 120 | 54 | 0.07 |
| 70 | 17.5 | 37.9 | 130 | 40.5 | 0.08 |
| 80 | 20 | 25.3 | 140 | 27 | 0.03 |
| 85 | 21.3 | 18.7 | 145 | 19.9 | 0.03 |
| 87.5 | 21.9 | 15.7 | 147 | 16.7 | 0.03 |
| 90 | 22.5 | 12.7 | 150 | 13.5 | 0.02 |
| 92.5 | 23.1 | 9.6 | 152 | 10.3 | 0.03 |
| 95 | 23.8 | 6.1 | 155 | 7.1 | 0.10 |
| 97.5 | 24.4 | 3.0 | 158 | 3.9 | 0.09 |

Figure 7:
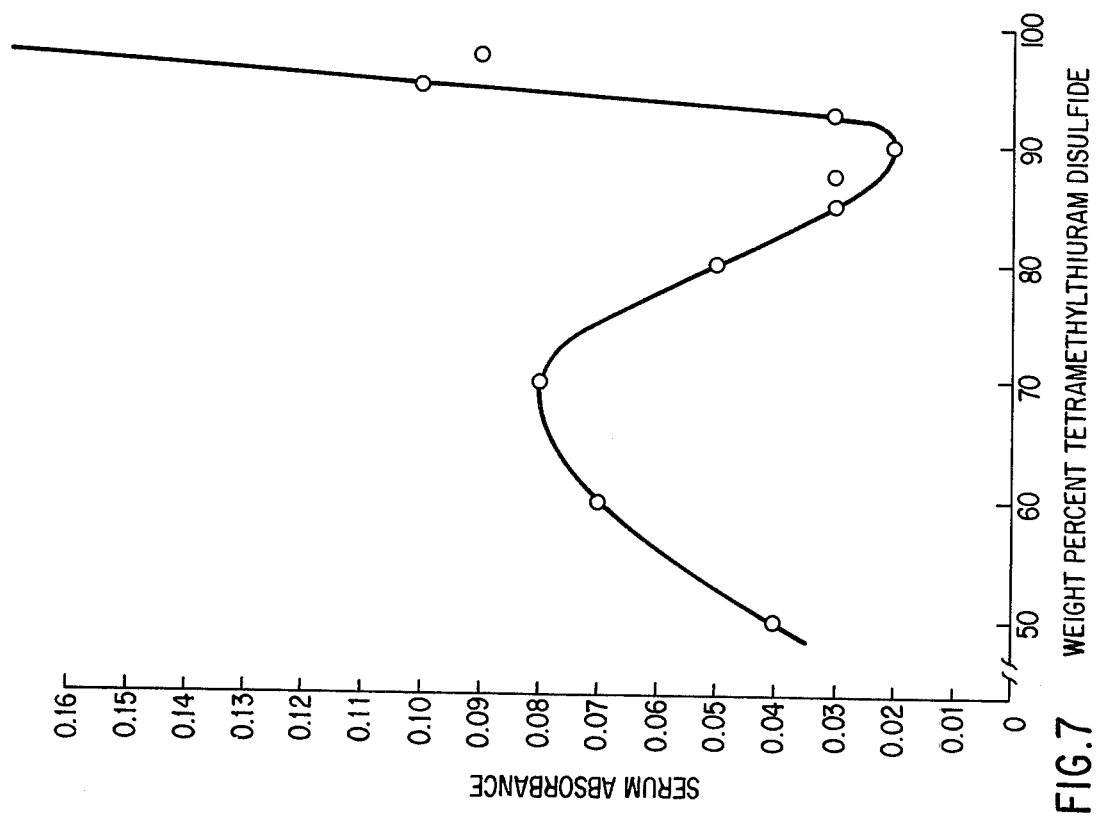
FIG. 7 is a plot of serum absorbance versus weight percent of tetramethylthiuram disulfide in predispersed chemical compositions.

A plot of this data is shown in FIG. 7. As can be seen from FIG. 7, the serum produced upon coagulation of mixtures of tetramethylthiuram disulfide and SBR latex exhibited optimum clarity and was substantially clear when the predispersed chemical composition produced comprised about 90 percent by weight of tetramethylthiuram disulfide and about 10 percent by weight of SBR.

EXAMPLE 8

Using the procedure set forth in Example 1 above, eleven predispersed chemical compositions containing 50, 60, 70, 80, 85, 90, 92, 94, 96, 98 and 99 percent by weight sulfur (RM 99.99) and a binder of nitrile rubber (NYsyn 30-5, Copolymer Rubber & Chemical Corp.) extended with dioctyl phthalate were prepared. For each of the runs, an appropriate amount of sulfur was added to the dilution water in the blender and agitated until it was deagglomerated and wetted. The nitrile rubber latex (19.8%TS) and the dioctyl phthalate emulsion (25%TS) were then added to the wetted sulfur and agitated for 10 seconds. Then the sulfuric acid coagulating solution was added to the mixtures during further agitation thereof. These mixtures were then agitated for an additional 60 seconds, the sides of the blender jar were washed down, and the agitated mixtures were immediately filtered through a 60 mesh stainless steel screen. The absorbance of the filtered serum for each of the eleven runs was measured and this data is set forth in Table VIII below:

TABLE VIII

| Weight Percent Sulfur | Weight Sulfur (grams) | Weight Latex (grams) | Weight DOP Emulsion (grams) |
|---|---|---|---|
| 50 | 12.5 | 47.35 | 12.5 |
| 60 | 15.0 | 37.88 | 10.0 |
| 70 | 17.5 | 28.41 | 7.5 |
| 80 | 20.0 | 19.51 | 5.0 |
| 85 | 21.25 | 14.21 | 3.75 |
| 90 | 22.5 | 9.47 | 2.50 |
| 92 | 23.0 | 7.58 | 2.0 |
| 94 | 23.5 | 5.68 | 1.5 |
| 96 | 24.0 | 3.79 | 1.0 |
| 98 | 24.5 | 1.89 | 0.5 |
| 99 | 24.75 | 0.95 | 0.25 |

| Weight Percent Sulfur | Dilution Water (ml.) | Coagulant (ml.) | Serum Absorbance |
|---|---|---|---|
| 50 | 113 | 29 | 1.50 |
| 60 | 122 | 23 | 1.01 |
| 70 | 138 | 17 | 1.03 |
| 80 | 145 | 12 | 0.86 |
| 85 | 146 | 9 | 0.61 |
| 90 | 150 | 6 | 0.27 |
| 92 | 152 | 6 | 0.15 |
| 94 | 154 | 6 | 0.11 |
| 96 | 156 | 6 | 0.07 |
| 98 | 158 | 6 | 0.18 |
| 99 | 159 | 6 | 0.34 |

Figure 8:
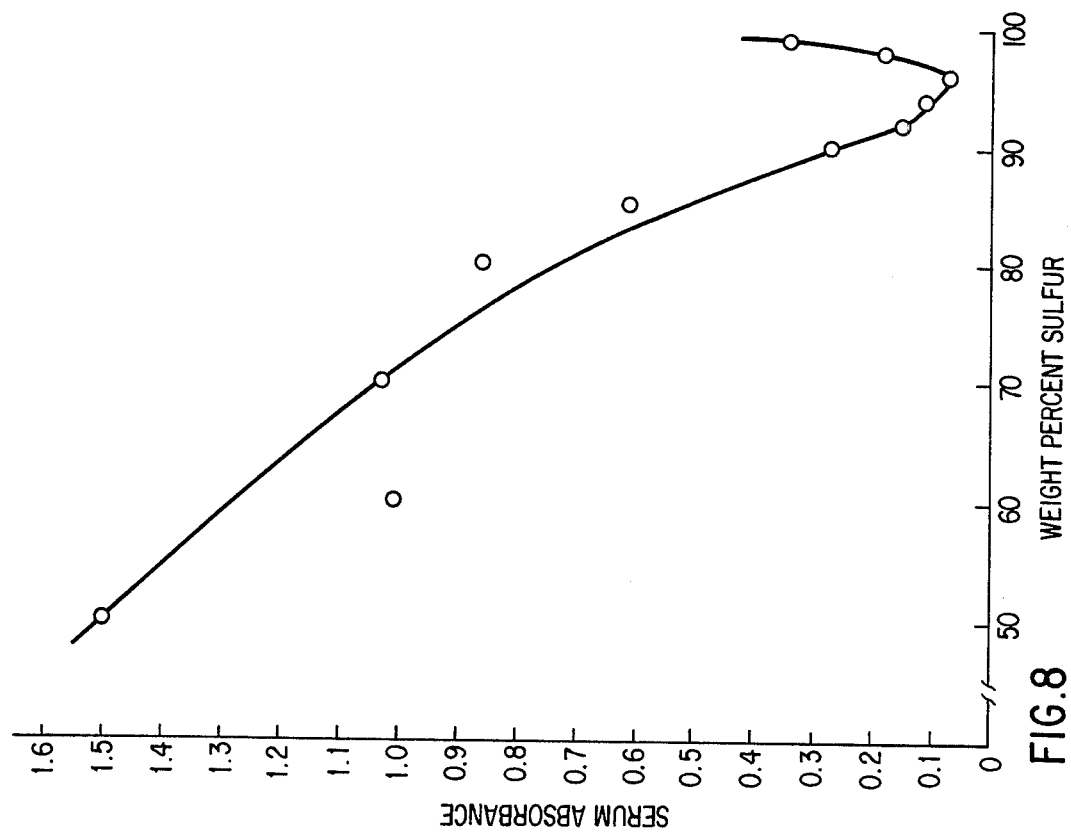
FIG. 8 is a plot of serum absorbance versus weight percent of sulfur in predispersed chemical compositions.

A plot of this data is shown in FIG. 8. Referring to FIG. 8, it can be seen that the serum produced upon coagulation of mixtures of sulfur, nitrile rubber latex, and dioctyl phthalate emulsion exhibited optimum clarity and was substantially clear when the predispersed chemical composition produced comprised about 96 percent by weight of sulfur and about 4 percent by weight of binder. By using a greater percentage of coagulant throughout the series, the value of serum absorbance for each of the above runs can be lowered.

EXAMPLE 9

Using the procedure of Example 1 above, seven predispersed chemical compositions were prepared which contained 75, 88, 90, 92, 94, 96 and 98 percent by weight of sulfur (RM 99.99) and a binder of a styrene-butadiene copolymer (1500 Type SBR). For each run, the appropriate amount of sulfur was added to the dilution water in the Waring Blender and agitated until it was deagglomerated and wetted. The SBR latex (19.8%TS) was then added and each mixture was agitated for 10 seconds. The mixtures were then coagulated by addition of the sulfuric acid coagulating solution during further agitation thereof. Following coagulation the mixtures were further agitated and then filtered. The pH of the serum obtained was between 2 and 4.5. The predispersed chemical compositions obtained were then washed, filtered and dried.

An amount of each of the seven predispersed chemical compositions to provide 1.75 phr of sulfur was then milled into 336.3 g. of unvulcanized rubber stock to determine the amount of time required for it to completely disperse in the stock. The unvulcanized rubber stock which was used had the composition set forth in Table IX below:

TABLE IX

| Constituents | Parts by Weight |
|---|---|
| SBR 1614 | 189 |
| Stearic acid | 1.92 |
| SZD-85[1] | 7.41 |
| T(DPG)D-65[2] | 1.26 |
| E(M)D-75[3] | 2.16 |

[1]A POLY-DISPERSION ® of 85% zinc oxide in an SBR binder.
[2]A POLY-DISPERSION ® of 65% diphenylguanidine in an EPDM binder.
[3]A POLY-DISPERSION ® of 75% mercaptobenzothiazole in an EPR binder.

The same quantity of untreated sulfur was also milled into unvulcanized rubber stock so that the rates of incorporation could be compared. A 6 inch × 12 inch two-roll laboratory mill was used in all of the examples herein in which milling was required. The observed incorporation times for each run are set forth in Table X below:

TABLE X

| Weight Percent Sulfur | Weight Sulfur (grams) | Weight Latex (grams) | Dilution Water (ml.) | Coagulant (ml.) | Incorporation Time (seconds) |
|---|---|---|---|---|---|
| 75 | 18.75 | 32.6 | 132 | 19 | 35 |
| 88 | 22 | 15.6 | 148 | 9 | 22 |
| 90 | 22.5 | 13.0 | 150 | 7.5 | 25 |
| 92 | 23 | 10.4 | 152 | 6 | 22 |
| 94 | 23.5 | 7.8 | 154 | 4.5 | 25 |
| 96 | 24 | 5.2 | 156 | 4 | 30 |
| 98 | 24.5 | 2.6 | 158 | 4 | 38 |
| 100 | 25.0 | — | 160 | — | 63 |

It was expected that the more binder the predispersion contained, the more physically like the rubber stock the predispersion became and therefore the more rapid would be the incorporation. It was also expected that, conversely, the more sulfur the predispersion contained, the more physically like the dry powder sulfur the predispersion became and the incorporation time would approach that observed with untreated sulfur. Quite unexpectedly, however, it was found that as the amount of sulfur in the predispersion increased the incorporation time did not increase and approach that of the dry powder sulfur, but instead actually decreased substantially.

EXAMPLE 10

Using the procedure of Example 9 above, six predispersed chemical compositions were prepared which contained 70, 80, 92, 94, 96 and 98 percent by weight of sulfur (RM 99.99) and a binder comprising 75 percent by weight of a styrene-butadiene copolymer (1712 Type SBR) and 25 percent by weight of an aromatic petroleum oil (Sundex 790). For each run, the appropriate amount of sulfur was added to the dilution water in the blender and agitated until it was deagglomerated and wetted. The SBR latex (18.8%TS) and an emulsion of the oil (20%TS) were then added and each mixture was agitated for 10 seconds. Each mixture was then coagulated by addition of the sulfuric acid coagulation solution during further agitation thereof. Following coagulation, each mixture was further agitated and then filtered. The pH of the resulting serum was between 2 and 4.5. The predispersions were then washed, filtered and dried.

An amount of each of the six predispersions to provide 1.75 phr of sulfur was then milled into 336.3 g. of unvulcanized rubber stock having the composition shown in Table IX above to determine its incorporation time. The same quantity of untreated sulfur was similarly milled into the same stock so that the rates of incorporation could be compared. The observed incorporation times for each run are given in Table XI below:

TABLE XI

| Weight Percent Sulfur | Weight Sulfur (grams) | Weight Latex (grams) | Weight Oil Emulsion (grams) |
|---|---|---|---|
| 70 | 35 | 59.8 | 37.5 |
| 80 | 40 | 39.9 | 25.0 |
| 92 | 46 | 16.0 | 10.0 |
| 94 | 47 | 12.0 | 7.5 |
| 96 | 48 | 8.0 | 5.0 |
| 98 | 49 | 4.0 | 2.5 |
| 100 | 50 | — | — |

| Weight Percent Sulfur | Dilution Water (ml.) | Coagulant (ml.) | Incorporation Time (seconds) |
|---|---|---|---|
| 70 | 151 | 33.75 | 40 |
| 80 | 168 | 22.5 | 36 |
| 92 | 187 | 9.0 | 33 |
| 94 | 190 | 7.0 | 34 |
| 96 | 194 | 4.5 | 33 |
| 98 | 197 | 3 | 37 |
| 100 | 200 | — | 63 |

As can be seen from Table XI, it was found most unexpectedly that as the amount of sulfur in the predispersion increased, the incorporation time did not increase and approach that of the dry powder sulfur, but instead, decreased significantly.

EXAMPLE 11

Using the procedure of Example 10 above, eight predispersed chemical compositions were prepared which contained 50, 60, 70, 80, 90, 95, 97 and 98 percent by weight of sulfur (RM 99.99) and a binder of a styrene-butadiene copolymer (1500 Type SBR). For each run the amount of sulfur indicated in Table XII below was added to the dilution water in a Waring Blender and agitated until it was deagglomerated and wetted. The SBR latex (19.8%TS) was then added and each mixture was agitated for 10 seconds. The mixtures were then coagulated by addition of sulfuric acid coagulation solution. Following coagulation, the mixtures were further agitated and filtered through a 60 mesh stainless steel screen. The pH of the serum obtained was between 2 and 4.5. The predispersed chemical compositions obtained were then washed, filtered and dried. The absorbance of the filtered serum of each of the runs was obtained immediately upon coagulation and is set forth in Table XII below:

TABLE XII

| Weight Percent Sulfur | Weight Sulfur (grams) | Weight Latex (grams) | Dilution Water (ml.) | Coagulant (ml.) | Serum Absorbance |
|---|---|---|---|---|---|
| 50 | 12.5 | 63.1 | 110 | 37.5 | 0.050 |
| 60 | 15.0 | 50.5 | 120 | 30.0 | 0.065 |
| 70 | 17.5 | 37.9 | 130 | 22.5 | 0.100 |
| 80 | 20.0 | 25.3 | 140 | 15.0 | 0.085 |
| 90 | 22.5 | 12.7 | 150 | 7.5 | 0.065 |
| 95 | 23.75 | 6.31 | 155 | 3.75 | 0.040 |
| 97 | 24.3 | 3.5 | 157 | 4 | 0.020 (0.42) |
| 98 | 24.5 | 2.5 | 158 | 4 | 0.025 |
| 100 | 25.0 | — | 160 | — | 0.100 |

Initially, the absorbance value of the serum obtained upon coprecipitation of the predispersion containing 97 percent by weight of sulfur was measured to be 0.42. Since this value was clearly inconsistent with the other values obtained, the run was duplicated and a value of 0.020 was then obtained.

An amount of each of the eight predispersions to provide 1.75 phr of sulfur was then milled into 336.3 g. of unvulcanized rubber stock having the composition set forth in Table IX above to determine the amount of time required for complete incorporation. The incorporation time of 1.75 phr of untreated sulfur was also determined so that the rates of incorporation could be compared. The observed incorporation times for each run and tensile strengths of the resulting vulcanizates are set forth in Table XIII below:

TABLE XIII

| Wt. Percent Sulfur | Incorporation Time (seconds) | Tensile strength (p.s.i.) |
|---|---|---|
| 50 | 35 | 840 |
| 60 | 35 | 715 |
| 70 | 35 | 1775 |
| 80 | 31 | 1700 |
| 90 | 35 | 1500 |
| 95 | 30 | 1735 |
| 97 | 27 | 2485 |
| 98 | 31 | 2370 |
| 100 | 35 | 2000 |

As can be seen from Table XIII, it was found most unexpectedly as it had been found in Examples 9 and 10 above, that as the amount of sulfur in the predispersion increased, the incorporation time did not increase and approach that of dry sulfur, but decreased instead. Referring to Tables XII and XIII it can be seen that at about 97 percent by weight of sulfur in the predispersion, the serum attains maximum clarity, the incorporation time is at a minimum, and maximum tensile strength of the resulting vulcanizate is achieved.

EXAMPLES 12-14

In order to avoid grinding and handling of finely divided dry powdered chemical, wet filtercakes were used directly to prepare predispersed chemical compositions. Wet filtercakes of zinc dimethyldithiocarbamate (Vulcacure ZM, 42.0%TS, Alco Chemical Co.), zinc diethyldithiocarbamate (Vulcacure ZE, 52.7%TS, Alco Chemical Co.), and zinc dibutyldithiocarbamate (Vulcacure ZB, 55.0%TS, Alco Chemical Co.) were combined directly with a latex of a styrene-butadiene copolymer (1500 Type SBR, 19.8%TS) without further dilution and agitated. About 50 ml. of 0.06M zinc sulfate solution was used to coagulate each mixture. The fine particle size of the wet filtercakes provided good dispersion in the latex upon gentle stirring with a blade spatula and produced a very fine predispersion upon coagulation. The data for the predispersed chemical compositions is set forth in Table XIV below:

TABLE XIV

| Example Number | Chemical | % TS | Filtercake Wt.(grams) |
|---|---|---|---|
| 12 | Vulcacure ZM | 42.0 | 101.0 |
| 13 | Vulcacure ZE | 52.7 | 80.6 |
| 14 | Vulcacure ZB | 55.0 | 77.3 |

| Example Number | Chemical Wt.(grams) | SBR Latex Wt.(grams) | Rubber Wt.(grams) | Wt. Percent Chemical |
|---|---|---|---|---|
| 12 | 42.9 | 27.9 | 5.5 | 88.6 |
| 13 | 42.5 | 27.9 | 5.5 | 88.5 |
| 14 | 42.5 | 27.9 | 5.5 | 88.5 |

EXAMPLE 15

A predispersed chemical composition was produced by preparing the chemical in situ and coprecipitating it with the binder emulsion simultaneously. About 200 ml. of water was added to 49.75 grams of 40% sodium dimethyldithiocarbamate solution (Pennwalt Corp.) in a one-liter beaker. The pH of this solution was adjusted to 7-8 with dilute sulfuric acid. To this diluted solution was added 19.2 grams of a latex of a styrene-butadiene copolymer (1500 Type SBR, 19.8%TS). This mixture was then thoroughly agitated. Then 200 ml. of a solution containing 30.0 grams of zinc sulfate heptahydrate (Fisher Scientific) was added to the mixture while stirring. Coagulation was immediate and complete resulting in a clear serum free of unprecipitated sodium dimethyldithiocarbamate and having a pH of 6.1. The predispersed chemical composition which contained 85 percent by weight of zinc dimethyldithiocarbamate was filtered, washed, filtered again and dried.

EXAMPLE 16

Using the procedure of Example 15 above, 50.1 grams of 40% sodium dimethyldithiocarbamate solution was diluted with about 300 ml. of water, and the pH was adjusted to 7-8 with dilute sulfuric acid. To this diluted solution was added 19.2 grams of an emulsion of a styrene-butadiene copolymer (1500 Type SBR, 19.8% TS). This mixture was then agitated thoroughly and 200 ml. of a solution containing 16.0 grams of copper chloride (Fisher Scientific) was added thereto while stirring. The copper added was in excess of that needed to form the copper dimethyldithiocarbamate and to coagulate the latex. The predispersed chemical composition which contained 85 percent by weight of copper dimethyldithiocarbamate was filtered, washed free of excess copper, and dried.

EXAMPLE 17

Since the dried predispersion of Example 16 was found to be harder than desirable, an oil extended predispersion of copper dimethyldithiocarbamate was prepared. About 200 ml. of water was added to 25.0 grams of 40% sodium dimethyldithiocarbamate solution and the pH was adjusted to 7-8 with dilute sulfuric acid. To this diluted solution was added 4.7 grams of a latex of a styrene-butadiene copolymer (1500 Type SBR, 19.8% TS) and 3.8 grams of an aromatic petroleum oil emulsion (25% Sundex 790). This mixture was then coagulated by adding about 50 ml. of a solution containing 5.0 grams of copper chloride to the mixture during agitation thereof. The predispersed chemical composition which contained 85 percent by weight of copper dimethyldithiocarbamate, 7.5 percent by weight of SBR, and 7.5 percent by weight of oil was a much softer solid than that prepared in Example 16 and was a very good dispersion.

EXAMPLE 18

Two rubber compounding chemicals that form a eutectic composition upon mixing are benzothiazyl disulfide (M-B-T-S, Uniroyal) and tetramethylthiuram disulfide (TUEX, Uniroyal). Since the heat of mixing on a mill or in a Banbury is sufficient to produce the liquid eutectic which tends to soften the binder and inhibit further mixing, the upper concentration of a 50/50 mixture of these two chemicals mechanically mixed into a binder was found to be about 40 percent by weight. By using the low temperature coprecipitation process described herein, the melting point of the eutectic is never reached and predispersions containing high chemical concentrations can be achieved. To a beaker containing dilution water was added 45.0 grams of powdered TUEX and 45.0 grams of powdered M-B-T-S. This mixture was agitated until all of the chemical was deagglomerated and wetted. To this mixture was added 50.5 grams of a latex of a styrene-butadiene copolymer (1500 Type SBR, 19.8% TS). This mixture was then agitated and sufficient zinc sulfate solution for coagulation was added during further agitation thereof. The predispersion which contained 90 percent by weight of chemical was filtered, washed, filtered again, and dried. The serum produced upon coagulation was clear.

EXAMPLE 19

Blowing agents are also difficult to mechanically mix with binders at high concentrations due to their relatively low decomposition temperatures. Since the coprecipitation process described herein has a low heat history, predispersions containing high concentrations of blowing agents can be prepared. 42.5 grams of each of azodicarbonamide (Celogen AZ, Uniroyal), p,p'-oxybis(benzenesulfonyl hydrazide) (Celogen OT, Uniroyal), dinitrosopentamethylene tetramines (Opex 93, Stepan Chemical Co.) and (Unicel 100, E. I. duPont deNemours & Co.) were added to four beakers containing 50 ml. of dilution water, and agitated until deagglomerated and wetted. To each of the wetted blowing agents was added 27.9 grams of a latex of a styrene-butadiene copolymer (1500 Type SBR, 19.8% TS). These mixtures were then agitated and an excess of zinc sulfate coagulation solution (50 ml.) was added during additional agitation thereof. The predispersions contained 88.5 percent by weight blowing agent and 11.5 percent by weight binder.

Similarly, two predispersions containing 85 percent by weight of Celogen OT were prepared by mixing 42.5 grams of the blowing agent with 7.5 grams of a nitrile rubber latex of either NYsyn 30-5 (22.3% TS, Copolymer Rubber & Chem. Corp.) or NYsyn 35-5 (22.3% TS, Copolymer Rubber & Chem. Corp.). Each of these mixtures was than agitated and coagulated with 100 ml. of the zinc sulfate coagulation solution.

EXAMPLE 20

An appropriate amount (42.5 grams) of polymerized 2,2,4-trimethyl-1,2-dihydroquinoline (Agerite MA, R. T. Vanderbilt) was added to a beaker containing 50 ml. of dilution water and agitated until the powder was deagglomerated and wetted. 37.88 grams of a latex of a styrene-butadiene copolymer (1500 Type SBR, 19.8% TS) was then added to the wetted chemical and agitated. 50 ml. of the standard zinc sulfate coagulation solution was added to coagulate this mixture during further agitation thereof. The predispersion contained 85 percent by weight of Agerite MA and 15 percent by weight SBR binder. The resulting serum was clear and had a pH of 6.2.

EXAMPLE 21

To a mixture of 40.0 grams of ethylene thiourea (NA-22) and 1.0 gram of magnesium oxide (MgO #340, Michigan Chem. Co.) was added 50 ml. of dilution water. This mixture was agitated with a spatula to deagglomerate and wet the powdered chemicals. Then, 20.0 grams of a 25 percent emulsion of dioctyl phthalate and 6.9 grams of a latex of a polychloroprene (Neoprene 635, 58% TS, E. I. duPont deNemours & Co.) were added to the mixture and agitated. This mixture was then coagulated with 100 ml. of the standard magnesium sulfate coagulation solution. The predispersion, which contained 80 percent by weight ethylene thiourea, 2 percent by weight magnesium oxide, 10 percent by weight dioctyl phthalate, and 8 percent by weight of polychloroprene rubber, was filtered from the serum, washed, filtered again and dried. It was found that the resulting serum was clear if very little water was used to wet the ethylene thiourea-magnesium oxide mixture. This mixture should be mixed directly with the latex for maximum dispersion, serum clarity and incorporation of ethylene thiourea.

EXAMPLES 22-32

In order to demonstrate the general applicability of the present process for use with various rubber and plastic compounding chemicals, binders, plasticizers, and coagulants, predispersions having the compositions set forth in Table XV below were prepared:

TABLE XV

| Example Number | Compounding Chemical | Polymer(s) | Plasticizer | Coagulation Solution | Wt. Percent Chemical | Wt. Percent Polymer(s) | Wt. Percent Plasticizer |
|---|---|---|---|---|---|---|---|
| 22 | MBTS | 1500 SBR | — | sulfuric acid | 85 | 15 | — |
| 23 | TUEX | 1502 SBR[1] | — | zinc sulfate | 85 | 15 | — |
| 24 | Sulfasan R[2] | 1502 SBR | — | zinc sulfate | 85 | 15 | — |
| 25 | Vultac Resin[3] | oxidized polyethylene | — | zinc sulfate | 95 | 5 | — |
| 26 | Vultac Resin | 1502 SBR | — | zinc sulfate | 97.5 | 2.5 | — |
| 27 | Tipure R101[5] | HYCAR 1577[6] | — | zinc sulfate | 85 | 15 | — |
| 28 | Tipure R101 | HYCAR 1577 | dioctyl phthalate | zinc sulfate | 85 | 11.25 | 3.75 |
| 29 | Basic lead silicate M202[7] | ABSON Latex[8] 162-29-77 | — | sulfuric acid | 85 | 15 | — |
| 30 | Basic lead silicate M202 | ABSON Latex 162-29-77 NYsyn 35-5 | — | sulfuric acid | 85 | 7.5 7.5 | — |
| 31 | Basic lead silicate M202 | ABSON LATEX 162-29-77 | dioctyl phthalate | sulfuric acid | 85 | 7.5 | 7.5 |
| 32 | DiCup R[9] | oxidized polyethylene | — | zinc sulfate | 80 | 20 | — |

[1]19.2% TS, Copolymer Rubber & Chemical Corp.
[2]4,4'-Dithiodimorpholine, Monsanto Co.
[3]Alkyl phenol disulfide, Pennwalt Corp.
[4]20.0% TS, Valchem Chemical Div., United Merchants
[5]Titanium dioxide, E.I. duPont deNemours & Co.
[6]ABS-type polymer 39.8% TS, B. F. Goodrich
[7]Eagle-Picher'PVC-nitrile blend 52.0% TS, B. F. Goodrich
[8]Dicumyl peroxide, Hercules, Inc.

EXAMPLE 33

A series of predispersions were prepared which comprised the same amounts of chemical and binder, but different amounts of dilution water and agitation, to determine the effect, if any, of each variable on the products of the coprecipitation. In each run 15.36 grams of natural rubber latex (65.1% TS) which has 10 grams of natural rubber therein was dispersed in 1000, 500, 250, 100, 75, 50 and 25 grams of dilution water. An example was also run without the addition of dilution water. To each batch of diluted latex was added 90 grams of sulfur (RM 99.99).

The sulfur would not wet or disperse in the latex diluted with 1000 grams of water. Therefore, the mixture was transferred to a Waring Blender and agitated for 60 and 120 seconds. The sulfur still did not disperse, but the dilute latex was mechanically destabilized and "glued" the sulfur particles together. Then, an attempt was made to force a product by placing all of the ingredients into the Waring Blender in the order indicated above, agitating at high speed for 60 seconds, and adding a 200 ml. aqueous solution containing 10 grams of alum during further agitation of the mixture. A product was formed that stuck together and was not friable either before or after drying.

Using 500 grams of dilution water, it was found that most of the sulfur could be wetted with vigorous agitation. However, upon agitation the sulfur formed large agglomerates that precipitated to the bottom of the beaker containing the dilute latex. Thus, the sulfur was not uniformly dispersed throughout the latex and would not form a homogeneous product upon coagulation.

With 250 grams of dilution water, the sulfur could be wetted with mild agitation, but still did not disperse in the latex. The mixture was then transferred to a Waring Blender and agitated at the lowest speed for 30 seconds.

All of the sulfur was wetted, but a portion of the latex was mechanically destabilized so that the sulfur precipitated as a gummy mass. The sulfur was not dispersed in the latex following agitation.

The sulfur was wetted more easily when only 100 grams of dilution water was added, but still did not disperse in the latex. Agitation of the mixture in a Waring Blender produced a gummy precipitate of sulfur "glued" together with mechanically destabilized natural rubber. Again, the sulfur was not dispersed in the latex following agitation.

Using 75 grams of dilution water, the mixture formed a very fluid paste. However, after the paste was formed, a very small amount of latex drained from the mixture. This phenomena appeared to indicate a turning point at which the final product would be homogeneous since the homogeneity of the final product depends on the homogeneity of the mixture prior to coagulation. If solid and liquid phases are allowed to separate prior to coagulation, as is the case when too much water is used, a heterogeneous product will be formed. The mixture was then coagulated by adding a solution of 5 grams of alum in 100 grams of water. The product was very cakey and came down as a mass.

When 50 grams of dilution water was used, the mixture was worked into a paste in which the sulfur was wetted and formed a homogeneous mixture with the latex. The mixture did not granulate upon further mixing. A solution of 5 grams of alum dissolved in 100 grams of water was used to coagulate the mixture. The final product was very cakey and came down as a mass.

The mixture of sulfur and latex with 25 grams of dilution water was worked into a very homogeneous paste which tended to granulate. The mixture was coagulated with a solution of 5 grams of alum dissolved in 200 ml. of water. The resulting product was very cakey and came down as a mass which could be easily cut or broken with a spatula. The product was transferred to a Waring Blender and chopped for about 10 seconds to a particulated product that was separated from the serum, washed, filtered and dried.

With no dilution water added, the sulfur dispersed easily in the latex and appeared to deagglomerate and form a very homogeneous mixture. A simple blade spatula was used to prepare the mixture in a beaker. The mixture produced only a trace of sulfur when rubbed between the fingers. Better methods of mixing would produce an even more homogeneous mixture. Although the uncoagulated mixture was cakey, it was particulate in nature and dust-free. The mixture was coagulated with a solution of about 5 grams of alum dissolved in 100 ml. of water. Substantially clear serum was produced upon coagulation. The predispersed sulfur was separated from the serum, washed, filtered and dried. The predispersion was particulated and appeared to be very homogeneous.

Thus it appeared from this series of coprecipitations that a homogeneous predispersion could not be prepared regardless of the amount of agitation employed if there was so much water present in the mixture of sulfur and latex that the solid and liquid phases separated prior to coagulation. Even when homogeneous mixtures were prepared with less than about 75 grams of added dilution water, it was found that the less water that was added the more homogeneous and particulated would be the predispersion prepared. This is true because intimate mixing requires not only that the particles of chemical and particles of rubber in the latex be uniformly and homogeneously mixed, but that the particles be sufficiently close to one another so that they can come in contact and be bound together upon coagulation of the mixture. Thus, it was found that there was sufficient water in the aqueous phase of the rubber latex without the need for any additional dilution water to permit intimate mixture of the particles, although an even more intimate mixture could have been obtained if a high-speed blender had been used to mix the ingredients.

EXAMPLE 34

A series of predispersed chemical compositions were prepared in which the amount of chemical and binder were held constant, and the amount of water added to the Waring Blender was varied so that the percent of total solids in the mixtures prior to coagulation was varied.

In each run the same amount of zinc oxide (St. Joe 42/21) and a latex of a styrene-butadiene copolymer (1500 Type SBR, 19.8% TS) were intimately mixed with different amounts of dilution water to yield mixtures having 2.5, 5.26 and 17.66 percent total solids. Following coagulation of each of the mixtures, the serum was separated from the predispersed zinc oxide and the absorbance of the filtered serum was measured using the procedure of Example 1 above. The initial absorbance values fluctuated throughout the series. However, the absorbance values after one minute for the serums prepared from the mixtures having 17.66, 5.26 and 2.5 percent total solids were 0.01, 0.082 and 0.41, respectively. This data indicates that as more water is added to the mixture, the less intimate the mixture becomes upon agitation, and as a result, the serum produced becomes less clear.

EXAMPLE 35

A series of predispersions were prepared in which the percent of chemical and binder were held constant, the percent of total solids in the mixture prior to coagulation was varied, and the volume of the material in the Waring Blender was held constant. By maintaining the volume constant, the amount of agitation could be kept constant for each run.

In each run appropriate amounts of sulfur (RM 99.99), a latex of natural rubber (65.1% TS) and dilution water were intimately mixed to prepare mixtures having 9, 16.56, 28.14 and 43.4 percent total solids prior to coagulation. The mixture having 43.4 percent total solids was so thick that it would not flow in the blender, and thus, could not be intimately mixed. Each of the other mixtures was coagulated with the sulfuric acid coagulation solution to produce predispersions containing 90 percent by weight of sulfur. The serum produced for each run was separated from the predispersed sulfur and the absorbance of the filtered serum was measured in accordance with the procedure set forth in Example 1 above. The data for this series of predispersed chemical compositions is set forth in Table XVI below:

TABLE XVI

| Mixture % TS | Weight Sulfur (grams) | Weight Latex (grams) | Dilution Water (ml.) | Coagulant (ml.) | Serum Absorbance |
| --- | --- | --- | --- | --- | --- |
| 9.0 | 45.0 | 7.68 | 500 | 60 | 0.40 |
| 16.56 | 82.35 | 14.05 | 457.5 | 110 | 0.30 |
| 28.14 | 139.97 | 23.89 | 388.8 | 186.6 | 0.12 |
| 43.4 | 215.93 | 36.85 | 299.9 | 287.9 | — |

From this data it can be seen that the more water that is present in the system, the less intimate will be the mixture, and consequently, the less clear will be the serum produced. It is likewise apparent that if there is an insufficient amount of water present, the mixture will not flow sufficiently to permit the particles of chemical and binder to be intimately mixed.

EXAMPLE 36

A series of predispersed chemical compositions were prepared by mixing appropriate amounts of sulfur (RM 99.99) and a latex of natural rubber (65.1% TS) to yield mixtures having 10.6 percent total solids prior to coagulation. Upon coagulation, the predispersed sulfur compositions contained 90, 96 and 98 percent by weight of sulfur. The serums produced were separated from the predispersions and the absorbance of the filtered serums were measured using the procedure of Example 1 above. The data for this series of predispersed chemical compositions is set forth in Table XVII below:

TABLE XVII

| Weight Percent Sulfur | Weight Sulfur (grams) | Weight Latex (grams) | Dilution Water (ml.) | Coagulant (ml.) | Serum Absorbance |
|---|---|---|---|---|---|
| 90 | 22.5 | 3.84 | 154 | 30 | 0.05 |
| 96 | 24.0 | 1.54 | 159 | 30 | 0.015 |
| 98 | 24.5 | 0.77 | 159 | 30 | 0.00 |

This data indicates that as more chemical is added to the mixture, the clarity improves and reaches a point of optimum clarity at 98 percent sulfur. In this case, the serum achieved perfect clarity.

EXAMPLE 37

A series of five predispersed chemical compositions were produced by preparing the chemical in situ and coprecipitating it with the binder emulsion simultaneously. A sixth run was made in which the chemical was prepared in situ in the absence of a binder emulsion. For each run, an appropriate amount of a 40 percent sodium diethyldithiocarbamate solution was quantitatively transferred to the Waring Blender with the appropriate amount of dilution water. The pH of the solution was then adjusted to within the range of 7-8 with dilute sulfuric acid. While stirring, an appropriate amount of a latex of a styrene-butadiene copolymer (1500 Type SBR, 21.8% TS), where required, was added to the solution and the mixture was agitated for 30 seconds. 200 ml. of a zinc sulfate solution containing the appropriate amount of zinc sulfate for the chemical reaction, 10 percent excess of zinc sulfate and the proper amount of coagulation solution was then added to the mixture while stirring and the resulting mixture was agitated for an additional 60 seconds. Following agitation, the mixture was immediately filtered to separate the predispersed zinc diethyldithiocarbamate from the serum. It was found that when a chemical, such as zinc diethyldithiocarbamate, is prepared in situ, the particles of chemical formed are predispersed in the binder before they have a chance to agglomerate. As a result, the particles of predispersed chemical are much smaller than the 60 mesh screen used as a filtering means in the previous examples. If the 60 mesh screen were used, the separated serum would appear cloudy due to the presence of particles of the predispersion therein. In order to separate the particles of chemical formed in situ with or without a binder from the serum, a fine filter paper (Fisher Brand H 9-803-5B) was employed as the filtering means. Following separation with the fine filter paper, the absorbance of the filtered serum was immediately measured at 600 m$\mu$ using the procedures of Example 1 above. The data for the six runs are set forth in Table XVIII below:

TABLE XVIII

| Wt. Percent Chemical Predispersion | Weight ZnSO$_4$ · 7H$_2$O | | | Coagulant (ml.) |
| | Required (grams) | Excess (grams) | Total (grams) | |
|---|---|---|---|---|
| 50 | 5.97 | 0.60 | 6.57 | 30.0 |
| 70 | 8.36 | 0.84 | 9.20 | 18.0 |
| 80 | 9.56 | 0.96 | 10.52 | 12.0 |
| 90 | 10.75 | 1.08 | 11.83 | 4.5 |
| 95 | 11.35 | 1.14 | 12.49 | 3.0 |
| 100 | 11.95 | 1.20 | 13.15 | 0.0 |

| Wt. Percent Chemical in Predispersion | Dilution Water (ml.) | Wt. 40% Solution (grams) | Weight Latex (grams) | Serum Absorbance |
|---|---|---|---|---|
| 50 | 315 | 17.76 | 34.40 | ∞ |
| 70 | 305 | 24.87 | 20.64 | 1.00 |
| 80 | 300 | 28.42 | 13.76 | 0.40 |
| 90 | 300 | 31.97 | 6.88 | 0.04 |
| 95 | 300 | 33.75 | 3.44 | 0.00 |
| 100 | 300 | 35.53 | 0.00 | 0.05 |

Figure 9:
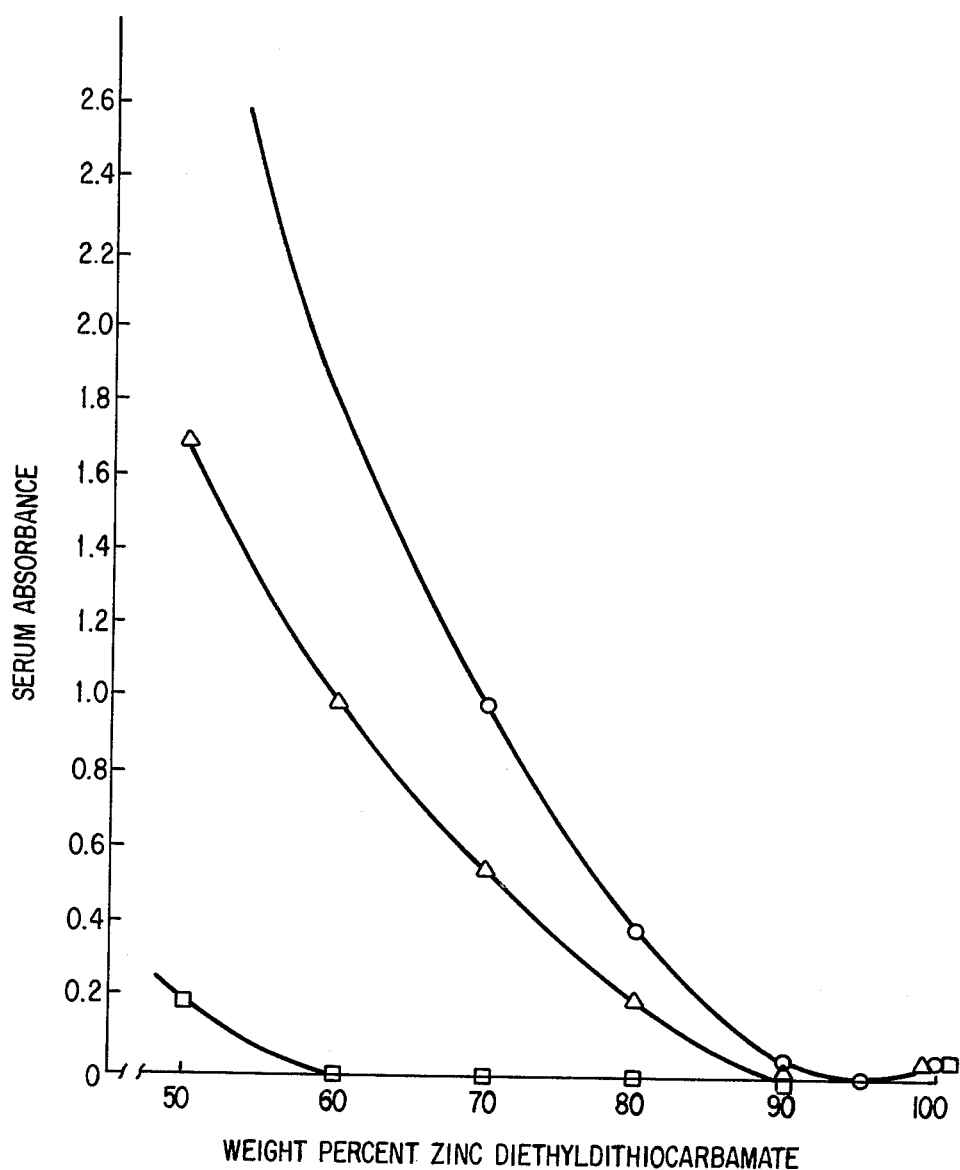
FIG. 9 is a plot of serum absorbance versus weight percent of zinc diethyldithiocarbamate in predispersed chemical compositions.

A plot of the above data for serum absorbance versus weight percent of zinc diethyldithiocarbamate is shown in FIG. 9. The points on the curve are indicated by small circles. As can be seen from FIG. 9, the serum produced upon preparation in situ and coprecipitation of the mixtures of zinc diethyldithiocarbamate and SBR latex using a 10 percent excess of zinc sulfate to react with the sodium diethyldithiocarbamate and to coagulate the latex exhibited its optimum clarity and was perfectly clear when the predispersed chemical composition comprised about 95 percent by weight of zinc diethyldithiocarbamate and about 5 percent by weight of SBR binder.

Another series of predispersed chemical compositions were prepared following the above procedure with the exception that a 15 percent excess of zinc sulfate was employed to react with the sodium diethyldithiocarbamate and to coagulate the latex. The data for the five runs are set forth in Table XIX below:

TABLE XIX

| Wt. Percent Chemical in Predispersion | Weight ZnSO$_4$ · 7H$_2$O | | | Coagulant (ml.) |
| | Required (grams) | Excess (grams) | Total (grams) | |
|---|---|---|---|---|
| 50 | 5.97 | 0.90 | 6.87 | 30.0 |
| 60 | 7.16 | 1.07 | 8.23 | 24.0 |
| 70 | 8.36 | 1.25 | 9.61 | 18.0 |
| 80 | 9.56 | 1.43 | 10.99 | 12.0 |
| 90 | 10.75 | 1.61 | 12.36 | 4.5 |

| Wt. Percent Chemical in Predispersion | Dilution Water (ml.) | Wt. 40% Solution (grams) | Weight Latex (grams) | Serum Absorbance |
|---|---|---|---|---|
| 50 | 315 | 17.76 | 34.40 | 1.70 |
| 60 | 310 | 21.32 | 27.52 | 1.00 |
| 70 | 305 | 24.87 | 20.64 | 0.56 |
| 80 | 300 | 28.42 | 13.76 | 0.21 |
| 90 | 300 | 31.97 | 6.88 | 0.00 |

A plot of the above data for serum absorbance versus weight percent of zinc diethyldithiocarbamate appears in FIG. 9. The points for this data are indicated by small triangles.

A further series of predispersed chemical compositions were prepared as above with the exception that a 25 percent excess of zinc sulfate was employed. The data for these five runs are set forth in Table XX below:

TABLE XX

| Wt. Percent Chemical in Predispersion | Weight ZnSO$_4$ · 7H$_2$O | | | Coagulant (ml.) |
|---|---|---|---|---|
| | Required (grams) | Excess (grams) | Total (grams) | |
| 50 | 5.97 | 1.49 | 7.46 | 30.0 |
| 60 | 7.16 | 1.79 | 8.95 | 24.0 |
| 70 | 8.36 | 2.09 | 10.45 | 18.0 |
| 80 | 9.56 | 2.39 | 11.95 | 12.0 |
| 90 | 10.75 | 2.69 | 13.44 | 4.5 |

| Wt. Percent Chemical in Predispersion | Dilution Water (ml.) | Wt. 40% Solution (grams) | Weight Latex (grams) | Serum Absorbance |
|---|---|---|---|---|
| 50 | 315 | 17.76 | 34.40 | 0.20 |
| 60 | 310 | 21.32 | 27.52 | 0.01 |
| 70 | 307 | 24.87 | 20.64 | 0.00 |
| 80 | 304 | 28.42 | 13.76 | 0.00 |
| 90 | 300 | 31.97 | 6.88 | 0.00 |

A plot of this data for serum absorbance versus weight percent of zinc diethyldithiocarbamate also appears in FIG. 9. The points for this data are indicated by small squares.

EXAMPLE 38

Three series of predispersed chemical compositions were prepared which comprised sulfur (RM 99.99) and a styrene-butadiene copolymer (1500 Type SBR). For each series, a different ratio of coagulant to binder was employed which was held constant throughout the series. For each run, the appropriate amount of sulfur and dilution water were placed in the Waring Blender and agitated for 120 seconds to deagglomerate and wet the sulfur. The appropriate amount of SBR latex (21.8% TS) was then added to the mixture while stirring and the resulting mixture was agitated for an additional 60 seconds. For the first series of runs, an appropriate amount of the sulfuric acid coagulation solution equivalent to 3.0 milliliters of solution per gram of rubber in the latex was added to the mixture and agitated for an additional 30 seconds. Immediately following agitation each mixture was filtered through a 60 mesh stainless steel screen and the absorbance of the filtered serum was measured at 600 m$\mu$. The data for the first series of runs are set forth in Table XXI below:

TABLE XXI

| Wt. Percent Sulfur | Dilution Water (ml.) | Weight Sulfur (grams) | Weight Latex (grams) | Coagulant (ml.) | Serum pH | Serum Absorbance |
|---|---|---|---|---|---|---|
| 50 | 110 | 12.50 | 57.34 | 37.5 | 2.1 | 0.44 |
| 60 | 120 | 15.00 | 45.87 | 30.0 | 2.3 | 0.33 |
| 70 | 130 | 17.50 | 34.40 | 22.5 | 2.4 | 0.28 |
| 80 | 140 | 20.00 | 22.94 | 15.0 | 3.1 | 0.20 |
| 90 | 150 | 25.50 | 11.47 | 7.5 | 3.1 | 0.09 |
| 95 | 155 | 23.75 | 5.73 | 3.8 | 4.0 | 0.06 |
| 100 | 155 | 25.00 | 0.00 | 3.8 | 3.4 | 0.62 |

Figure 10:
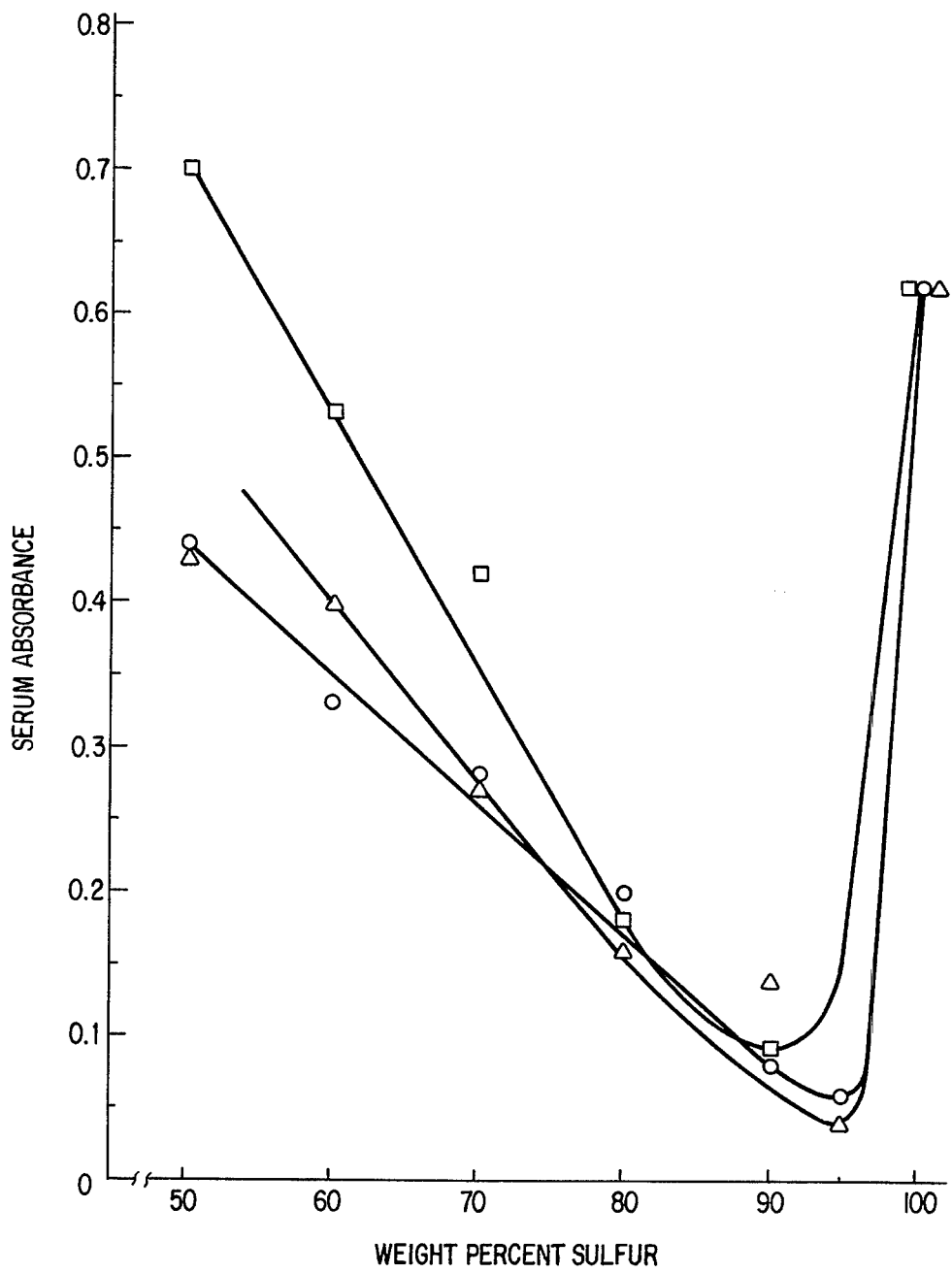
FIG. 10 is a plot of serum absorbance versus weight percent of sulfur in predispersed chemical compositions.

A plot of this data for serum absorbance versus weight percent of sulfur in the predispersion is shown in FIG. 10. The points on the curve are indicated by small circles.

A second series of predispersions were prepared following the above procedure with the exception that 2.5 milliliters of coagulation solution per gram of rubber in the latex was employed to coagulate the mixture in each run. The data for the second series are set forth in Table XXII below:

TABLE XXII

| Wt. Percent Sulfur | Dilution Water (ml.) | Weight Sulfur (grams) | Weight Latex (grams) | Coagulant (ml.) | Serum pH | Serum Absorbance |
|---|---|---|---|---|---|---|
| 50 | 110 | 12.50 | 57.34 | 31.3 | 2.7 | 0.43 |
| 60 | 110 | 15.00 | 45.87 | 25.0 | 2.8 | 0.40 |
| 70 | 115 | 17.50 | 34.40 | 18.8 | 3.1 | 0.27 |
| 80 | 120 | 20.00 | 22.94 | 12.5 | 3.3 | 0.16 |
| 90 | 120 | 22.50 | 11.47 | 6.3 | 3.6 | 0.14 |
| 95 | 115 | 23.75 | 5.73 | 3.1 | 4.2 | 0.04 |

A plot of this data for serum absorbance versus weight percent of sulfur in the predispersions is shown in FIG. 10 wherein the points are indicated by small triangles.

A third series of predispersions were prepared using the above procedure with the exception that 2.0 milliliters of coagulation solution per gram of rubber in the latex was used to coagulate the mixture in each run. The data for the third series are set forth in Table XXIII below:

TABLE XXIII

| Wt. Percent Sulfur | Dilution Water (ml.) | Weight Sulfur (grams) | Weight Latex (grams) | Coagulant (ml.) | Serum pH | Serum Absorbance |
|---|---|---|---|---|---|---|
| 50 | 90 | 12.50 | 57.34 | 25.0 | 2.7 | 0.70 |
| 60 | 90 | 15.00 | 45.87 | 20.0 | 3.0 | 0.53 |
| 70 | 90 | 17.50 | 34.40 | 15.0 | 2.9 | 0.42 |
| 80 | 90 | 20.00 | 22.94 | 10.0 | 3.1 | 0.18 |
| 90 | 90 | 25.50 | 11.47 | 5.0 | 3.4 | 0.09 |

A plot of this data for serum absorbance versus weight percent of sulfur in the predispersions is shown in FIG. 10. The points on the curve for this data are indicated by small squares.

Referring to FIG. 10, it can be seen that the improvement in serum clarity observed as the percent of chemical in the predispersion is increased occurs independently of the ratio of coagulant to binder. Although the use of more coagulant throughout results in a lowering of the absorbance value, in each series the point of optimum serum clarity and substantially clear serum results when the predispersion produced comprises about 95 percent by weight of sulfur and about 5 percent by weight of SBR binder.

What is claimed is:

1. A process for improving the clarity of the serum produced during coprecipitation of a rubber or plastic compounding chemical and a binder, comprising (a) intimately mixing at least one finely divided rubber or plastic compounding chemical, wherein substantially all of the particles thereof are at least about 0.05 micron in size, with a film-forming binder emulsion comprising a latex of a rubber or plastic polymer in the presence of an amount of water which permits intimate mixture thereof, wherein no compounding chemical used is a reinforcing agent or diluent for rubber or plastic stock, (b) adding a stoichiometric excess of a coagulating agent during further intimate mixing of the chemical and the binder emulsion to cause complete coagulation thereof, and (c) physically separating the substantially clear serum produced upon coagulation from the homogeneous, essentially non-tacky, dustless, friable particles of predispersed chemical which comprise from about 80 to about 99.5 percent by weight of said chemical and from about 0.5 to about 20 percent by weight of said binder.

2. The process of claim 1 wherein the finely divided chemical is in dry powder form.

3. The process of claim 2 wherein the chemical in finely divided powder form is intimately mixed with water to deagglomerate and wet the chemical prior to the intimate mixing of the chemical with the binder emulsion.

4. The process of claim 1 wherein the finely divided chemical is in the form of a wet filtercake.

5. The process of claim 1 wherein the finely divided chemical is formed by wet grinding coarse chemical.

6. The process of claim 1 wherein the compounding chemical has a particle size less than about 250 microns.

7. The process of claim 6 wherein the compounding chemical has a particle size less than about 50 microns.

8. The process of claim 1 wherein the polymer latex is natural rubber latex.

9. The process of claim 1 wherein the polymer latex was prepared by an emulsion polymerization process.

10. The process of claim 9 wherein the polymer latex is selected from the group consisting of latices of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

11. The process of claim 1 wherein the polymer was prepared by a solution polymerization process and subsequently emulsified to form the latex.

12. The process of claim 11 wherein the polymer latex is selected from the group consisting of latices of EPDM, EPR, oxidized polyethylene, polyisobutylene, butyl rubber, polyisoprene, block copolymers of styrene and butadiene, and thermoplastic rubbers.

13. A process for improving the clarity of the serum produced during coprecipitation of a rubber or plastic compounding chemical and a binder, comprising
(a) intimately mixing at least one finely divided rubber or plastic compounding chemical wherein substantially all of the particles thereof are at least about 0.05 micron in size, with a film-forming binder emulsion comprising a latex of a rubber or plastic polymer and an emulsion of a plasticizer for the polymer in the presence of an amount of water which permits intimate mixture thereof, wherein no compounding chemical is a reinforcing agent or diluent for rubber or plastic stock,
(b) adding a stoichiometric excess of a coagulating agent during further intimate mixing of the chemical and the binder emulsion to cause complete coagulation thereof, and
(c) physically separating the substantially clear serum produced upon coagulation from the homogeneous, essentially non-tacky, dustless, friable particles of predispersed chemical which comprise from about 80 to 99.5 percent by weight of said chemical and from about 0.5 to about 20 percent by weight of said binder.

14. The process of claim 13 wherein the finely divided chemical is in dry powder form.

15. The process of claim 14 wherein the compounding chemical in finely divided powder form is intimately mixed with water to deagglomerate and wet the chemical prior to the intimate mixing of the chemical with the binder emulsion.

16. The process of claim 13 wherein the finely divided chemical is in the form of a wet filtercake.

17. The process of claim 13 wherein the finely divided chemical is formed by wet grinding coarse chemical.

18. The process of claim 13 wherein the compounding chemical has a particle size less than about 250 microns.

19. The process of claim 18 wherein the compounding chemical has a particle size less than about 50 microns.

20. The process of claim 13 wherein the polymer latex is natural rubber latex.

21. The process of claim 13 wherein the polymer latex was prepared by an emulsion polymerization process.

22. The process of claim 21 wherein the polymer latex is selected from the group consisting of latices of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

23. The process of claim 13 wherein the polymer was prepared by a solution polymerization process and subsequently emulsified to form the latex.

24. The process of claim 23 wherein the polymer latex is selected from the group consisting of latices of EPDM, EPR, oxidized polyethylene, polyisobutylene, butyl, rubber, polyisoprene, block copolymers of styrene and butadiene, and thermoplastic rubbers.

25. The process of claim 13 wherein the binder comprises less than about 98 percent by weight of the plasticizer.

26. A process for improving the clarity of the serum produced during preparation and coprecipitation of a rubber or plastic compounding chemical and a binder, comprising,
(a) intimately mixing a solution of a water soluble salt containing the organic portion of the desired compounding chemical with a film-forming binder emulsion comprising a latex of a rubber or plastic polymer in the presence of an amount of water which permits intimate mixture thereof,
(b) during further intimate mixing, adding a solution of a water soluble salt containing the metal cation desired in the compounding chemical, wherein the amount of metal cation present is in excess of that required to quantitatively react with the soluble salt containing the organic portion of the desired compounding chemical to form the desired compounding chemical and to coagulate the binder emulsion, thereby forming the desired compounding chemical and coprecipitating it with the binder substantially simultaneously, and wherein the compounding chemical prepared is not a reinforcing agent or diluent for rubber or plastic stock, and
(c) physically separating the substantially clear serum produced upon coagulation from the homogeneous, essentially non-tacky, dustless, friable particles of predispersed chemical which comprise from about 80 to about 99.5 percent by weight of said chemical and from about 0.5 to about 20 percent by weight of said binder.

27. The process of claim 26 wherein the binder emulsion further comprises an emulsion of a plasticizer for the polymer.

28. The process of claim 27 wherein the binder comprises less than about 98 percent by weight of the plasticizer.

29. The process of claim 26 wherein the polymer latex is natural rubber latex.

30. The process of claim 26 wherein the polymer latex was prepared by an emulsion polymerization process.

31. The process of claim 30 wherein the polymer latex is selected from the group consisting of latices of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

32. The process of claim 26 wherein the polymer was prepared by a solution polymerization process and subsequently emulsified to form the latex.

33. The process of claim 32 wherein the polymer latex is selected from the group consisting of latices of EPDM, EPR, oxidized polyethylene, polyisobutylene, butyl rubber, polyisoprene, block copolymers of styrene and butadiene, and thermoplastic rubbers.

34. The process of claim 26 wherein the compounding chemical is selected from the group consisting of the dithiocarbamates, the thiazoles, and the xanthates.

35. A product comprising (i) substantially clear serum and (ii) homogeneous, essentially non-tacky, dustless, friable particles of predispersed rubber or plastic compounding chemical which comprise from about 80 to about 99.5 percent by weight of said chemical and from about 0.5 to about 20 percent by weight of a binder, said product prepared in accordance with a coprecipitation process comprising,
(a) intimately mixing at least one finely divided rubber or plastic compounding chemical wherein substantially all of the particles thereof are at least about 0.05 micron in size with a film-forming binder emulsion comprising a latex of a rubber or plastic polymer in the presence of an amount of water which permits intimate mixture thereof, wherein no compounding chemical used is a reinforcing agent or diluent for rubber or plastic stock, and
(b) adding a stoichiometric excess of a coagulating agent during further intimate mixing of the chemical and the binder emulsion to cause complete coagulation thereof.

36. The product of claim 35 wherein the fully divided chemical is in dry powder form.

37. The product of claim 36 wherein the chemical in finely divided powder form is intimately mixed with water to deagglomerate and wet the chemical prior to the intimate mixing of the chemical with the polymer latex.

38. The product of claim 35 wherein the finely divided chemical is in the form of a wet filtercake.

39. The product of claim 35 wherein the finely divided chemical is formed by wet grinding coarse chemical.

40. The product of claim 35 wherein the compounding chemical has a particle size less than about 250 microns.

41. The product of claim 40 wherein the compounding chemical has a particle size less than about 50 microns.

42. The product of claim 35 wherein the polymer latex is natural rubber latex.

43. The product of claim 35 wherein the polymer latex was prepared by an emulsion polymerization process.

44. The product of claim 43 wherein the polymer latex is selected from the group consisting of latices of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

45. The product of claim 35 wherein the polymer was prepared by a solution polymerization process and subsequently emulsified to form the latex.

46. The product of claim 45 wherein the polymer latex is selected from the group consisting of latices of EPDM, EPR, oxidized polyethylene, polyisobutylene, butyl rubber, polyisoprene, block copolymers of styrene and butadiene, and thermoplastic rubbers.

47. A product comprising (i) substantially clear serum and (ii) homogeneous, essentially non-tacky, dustless, friable particles of predispersed rubber or plastic compounding chemical which comprise from about 80 to about 99.5 percent by weight of said chemical and from about 0.5 to about 20 percent by weight of a binder, said product prepared in accordance with a coprecipitation process comprising,
(a) intimately mixing at least one finely divided rubber or plastic compounding chemical wherein substantially all of the particles thereof are at least about 0.05 micron in size with a film-forming binder emulsion comprising a latex of rubber or plastic polymer and an emulsion of a plasticizer for the polymer in the presence of an amount of water which permits intimate mixture thereof, wherein no compounding chemical is a reinforcing agent or diluent for rubber or plastic stock, and
(b) adding a stoichiometric excess of a coagulating agent during further intimate mixing of the chemical and the binder emulsion to cause complete coagulation thereof.

48. The product of claim 47 wherein the finely divided chemical is in dry powder form.

49. The product of claim 48 wherein the compounding chemical in finely divided powder form is intimately mixed with water to deagglomerate and wet the chemical prior to the intimate mixing of the chemical with the binder emulsion.

50. The product of claim 47 wherein the finely divided chemical is in the form of a wet filtercake.

51. The product of claim 47 wherein the finely divided chemical is formed by wet grinding coarse chemical.

52. The product of claim 47 wherein the compounding chemical has a particle size less than about 250 microns.

53. The product of claim 52 wherein the compounding chemical has a particle size less than about 50 microns.

54. The product of claim 47 wherein the polymer latex is natural rubber latex.

55. The product of claim 47 wherein the polymer latex was prepared by an emulsion polymerization process.

56. The product of claim 55 wherein the polymer latex is selected from the group consisting of latices of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

57. The product of claim 47 wherein the polymer was prepared by a solution polymerization process and subsequently emulsified to form the latex.

58. The product of claim 57 wherein the polymer latex is selected from the group consisting of latices of EPDM, EPR, oxidized polyethylene, polyisobutylene, butyl rubber, polyisoprene, block copolymers of styrene and butadiene and thermoplastic rubbers.

59. The product of claim 47 wherein the binder comprises less than about 98 percent by weight of the plasticizer.

60. Associatively formed products of a coprecipitation process comprising (i) substantially clear serum and (ii) homogeneous, essentially non-tacky, dustless, friable particles of predispersed rubber or plastic compounding chemical which comprise from about 80 to about 99.5 percent by weight of said chemical and from about 0.5 to about 20 percent by weight of a binder comprising a rubber or plastic polymer, wherein substantially all of the particles of the compounding chemical are at least about 0.05 micron in size and no compounding chemical used is a reinforcing agent or diluent for rubber or plastic stock.

61. The products of claim 60 wherein the compounding chemical has a particle size less than about 250 microns.

62. The products of claim 61 wherein the compounding chemical has a particle size less than about 50 microns.

63. The products of claim 60 wherein the polymer is natural rubber.

64. The products of claim 60 wherein the polymer is selected from the group consisting of polybutadiene; copolymers of butadiene and one or more comonomers including styrene, acrylonitrile, methylmethacrylate, vinylpyridine, and derivatives of butadiene and a carboxylic acid; polymers of substituted butadiene; copolymers of vinyl acetate and ethylene; poly(vinyl chloride); poly(vinyl chloride-vinylidene chloride); poly(vinylidene chloride); and acrylonitrile-butadiene-styrene copolymer.

65. The products of claim 60 wherein the polymer is selected from the group consisting of EPDM, EPR, oxidized polyethylene, polyisobutylene, butyl rubber, polyisoprene, block copolymers of styrene and butadiene, and thermoplastic rubber.

66. The products of claim 60 wherein the binder further comprises a plasticizer for the polymer.

* * * * *

REEXAMINATION CERTIFICATE (84th)

United States Patent [19]

Leo et al.

[11] B1 4,110,240

[45] Certificate Issued May 17, 1983

[54] COPRECIPITATION PROCESS

[75] Inventors: Thomas J. Leo; Anders H. Johansson, both of Yardley, Pa.

[73] Assignee: Wyrough and Loser, Inc., Trenton, N.J.

Reexamination Request

No. 90/000,075, Sep. 25, 1981

Reexamination Certificate for:
Patent No.: 4,110,240
Issued: Aug. 29, 1978
Appl. No.: 820,557
Filed: Jul. 29, 1977

[51] Int. Cl.³ .................. C08C 1/14; C08J 3/20
[52] U.S. Cl. ... 252/182; 260/775; 260/776; 260/814; 260/821; 528/487; 528/490
[58] Field of Search .................. 252/182; 528/487, 490; 260/775, 776, 814, 821

[56] References Cited

U.S. PATENT DOCUMENTS

| | | | |
|---|---|---|---|
| 1,558,688 | 10/1925 | Loomis et al. | |
| 2,455,714 | 12/1948 | Waterman et al. | 260/821 |
| 2,459,748 | 1/1949 | Johnson | 260/821 |
| 2,485,287 | 10/1949 | Henson et al. | 260/41 |
| 2,572,884 | 10/1951 | Pollack et al. | 260/821 |
| 2,640,088 | 5/1953 | Glenn et al. | |
| 2,888,443 | 5/1959 | Hayes et al. | 260/79.5 |
| 2,888,444 | 5/1959 | Roberts et al. | |
| 2,921,931 | 1/1960 | Hayes. | |
| 3,640,975 | 2/1972 | Bilderbacle. | |
| 3,664,978 | 5/1972 | Uranech et al. | 260/821 |
| 3,700,620 | 10/1972 | Burke | 260/336 AQ |

FOREIGN PATENT DOCUMENTS

| | | |
|---|---|---|
| 457146 | 5/1949 | Canada. |
| 2121807 | 11/1972 | Fed. Rep. of Germany. |
| 1056331 | 2/1954 | France. |
| 1082947 | 1/1955 | France. |
| 37-7129 | 7/1962 | Japan. |
| 44-5081 | 3/1969 | Japan. |
| 734390 | 7/1955 | United Kingdom. |
| 852756 | 11/1960 | United Kingdom. |
| 856312 | 12/1960 | United Kingdom. |
| 880939 | 10/1961 | United Kingdom. |
| 1100587 | 1/1968 | United Kingdom. |
| 1209850 | 11/1970 | United Kingdom. |
| 1337761 | 11/1973 | United Kingdom. |
| 1365874 | 9/1974 | United Kingdom. |
| 1370391 | 10/1974 | United Kingdom. |
| 1389342 | 4/1975 | United Kingdom. |
| 1399314 | 7/1975 | United Kingdom. |
| 1450291 | 9/1976 | United Kingdom. |

*Primary Examiner*—Irwin Gluck

*Attorney, Agent, or Firm*—James R. Laramie; Frank E. Robbins; John E. Holmes

[57] ABSTRACT

Products of a coprecipitation process comprising (i) substantially clear serum and (ii) homogeneous, essentially non-tacky, dustless, friable particles of predispersed rubber or plastic compounding chemical which comprise from about 80 to about 99.5 percent by weight of said chemical and from about 0.5 to about 20 percent by weight of a film-forming binder comprising a rubber or plastic polymer, wherein substantially all of the particles of the compounding chemical are at least 0.05 micron in size and no compounding chemical used is a reinforcing agent or diluent for rubber or plastic stock, are formed associatively.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 11, lines 5–34.

The clarity of the serum can be observed by coprecipitating a compounding chemical and binder as described herein and then mechanically separating the serum from the predispersed chemical produced. Mechanical separation can be achieved by any well-known means such as by filtration through a screen or filter paper. Care must be taken to select a separation means having an opening or pore size which accurately separates the predispersed chemical product from the serum and any free particles of chemical or binder present in the serum. If the opening size is too small, then even the smallest particles will be separated from the serum and it will incorrectly be observed to be perfectly clear. If, on the other hand, the opening size is too large, then the small particles of predispersed chemical product will not be separated from the serum and it may incorrectly be observed to be cloudy. However, if the appropriate opening size is selected, accurate measurements can be made of the serum clarity. Following separation, the clarity of the serum can be observed using a suitable means such as a spectrophotometer to measure absorbance. It has been found, for example, that serum absorbance measured on a Bausch & Lomb Spectronic 20 at 600 [mu] *m*µ varies from perfectly clear at 0.0 to hazy or unclear at 0.1. Serums having absorbance values of below about 0.40 appear substantially clear to the naked eye. As the absorbance increases above those values, substantially clear serum gradually becomes less clear until the absorbance reaches a value of 0.1 at which point the serum is considered to be unclear.

Column 14, lines 39–59.

Immediately following agitation in the blender, the mixture was poured through a stainless steel screen. Since the particle size becomes increasingly smaller and approaches the particle size of the untreated chemical as the quantity of binder used decreases and becomes insufficient to adequately coat and bond together the particles of chemical, a screen having mesh size approximately that of the largest particles of chemical practically suitable for commercial usage i.e., about 250 microns or 60 mesh, was chosen to separate the predispersed chemical composition from the serum. Generally, the lack of clarity observed at low concentrations of chemical in the predispersion is due predominantly to the presence of minute suspended particles of polymer in the serum, and the lack of clarity at high concentrations of chemical is due predominantly to particles of unbound chemical in the serum. A portion of the filtered serum is then poured into a special test tube for use in a Bausch & Lomb Spectronic 20 spectrophotometer. The serum absorbance at 600 [mu] *m*µ is them measured using the spectrophotometer.

AS A RESULT OF REEXAMINATION. IT HAS BEEN DETERMINED THAT:

Claims 34 and 60–66, having been finally determined to be unpatentable, are cancelled.

Claims 1, 13, 26, 35, and 47 are determined to be patentable as amended:

1. A process for improving the clarity of the serum produced during coprecipitation of a *water insoluble, rubber or plastic compounding chemical, selected from the group consisting of cross-linking agents, curing agents, accelerators, antidegradants, antioxidants, antiozonants, chemical and heat stabilizers, vulcanizing agents, blowing agents, blowing agent activators, retardants, flame retardants, cure modifiers and pigments,* and a binder, comprising
   (a) intimately mixing at least one finely divided rubber or plastic compounding chemical, wherein substantially all of the particles thereof are [at least] *greater than* about 0.05 micron in size, with a film-forming binder emulsion comprising a latex of a rubber or plastic polymer in the presence of [an] *only that* amount of water [which permits intimate mixture thereof] *and with that degree of intimacy of mixing that will permit the particles of chemical and the particles of binder to be uniformly and homogeneously mixed and to be sufficiently close to one another so that they can come in contact and be bound together upon coagulation of the mixture,* wherein no compounding chemical used is a *finely divided, high surface area,* reinforcing agent or diluent for the rubber or plastic stock,
   (b) adding a stoichiometric excess *of up to 10 percent* of a coagulating agent *which destabilizes the particles of binder by reacting with the emulsifier for the particles of binder* during further intimate mixing of the chemical and the binder emulsion to cause complete coagulation thereof, and
   (c) physically separating the substantially clear serum *having optimum clarity* produced upon coagulation from the homogeneous, essentially nontacky, [dustless,] friable particles of predispersed chemical which *are dustless upon drying, wherein the particles of predispersed chemical comprise* from about 80 to about 99.5 percent by weight of said chemical and from about 0.5 to about 20 percent by weight of said binder *and wherein the amounts of said chemical and said binder are selected such that a substantially clear serum having optimum clarity is obtained.*

13. A process for improving the clarity of the serum produced during coprecipitation of a *water insoluble,* rubber or plastic compounding chemical, *selected from the group consisting of cross-linking agents, curing agents, accelerators, antidegradants, antioxidants, antiozonants, chemical and heat stabilizers, vulcanizing agents, blowing agents, blowing agents activators, retardants, flame retardants, cure modifiers and pigments,* and a binder, comprising
   (a) intimately mixing at least one finely divided rubber or plastic compounding chemical, wherein substantially all of the particles thereof are [at least] *greater than* about 0.05 micron in size, with a film-forming binder emulsion comprising a latex of a rubber or plastic polymer *and an emulsion of a plasticizer for the polymer* in the presence of [an] *only that* amount of water [which permits intimate mixtures thereof] *and with that degree of intimacy of mixing that will permit the particles of chemical and the particles of binder to be uniformly and homogeneously mixed and to be sufficiently close to one another so that they can come in contact and be bound together upon coagulation of the mixture,* wherein no compounding chemical used is a *finely divided, high surface area* reinforcing agent or diluent for the rubber or plastic stock, (b) adding a stoichiometric excess *of up to 10 percent* of a coagulating agent *which destabilizes the particles of binder by reacting with the emulsifier for the particles of binder* during further intimate mixing of the chemical and the binder emulsion to cause complete coagulation thereof, and (c) physically separating the substantially clear serum *having optium clarity* produced upon coagulation from the homogeneous, essentially non-tacky, [dustless,] friable particles of predispersed chemical which *are dustless upon drying, wherein the particles of predispersed chemical comprise from about 80 to about 99.5 percent by weight of said chemical and from about 0.5 to about 20 percent by weight of said binder and wherein the amounts of said chemical and said binder are selected such that a substantially clear serum having optimum clarity is obtained.*

26. A process for improving the clarity of the serum produced during preparation and coprecipitation of a rubber or plastic compounding chemical *selected from the group consisting of the water insoluble, metal salts of dithiocarbamates, thiazoles, and xanthates,* and a binder, comprising (a) intimately mixing a solution of a water soluble salt [containing the organic portion of the desired compounding chemical] *of a dithiocarbamate, a thiazole or a xanthate* with a film-forming binder emulsion comprising a latex of a rubber or plastic polymer in the presence of an amount of water which permits intimate mixture thereof, (b) during further intimate mixing, adding a solution of a water soluble salt containing the metal cation desired in the compounding chemical, wherein the amount of metal cation present is in *up to 10 percent* excess of that required to quantitatively react with the soluble salt [containing the organic portion of the desired compounding chemical] *of the dithiocarbamate, thiazole or xanthate* to form the desired compounding chemical and to coagulate the binder emulsion, thereby forming the desired compounding chemical and coprecipitating it with the binder substantially simultaneously, [and] wherein the compounding chemical prepared is not a *finely-divided, high surface area* reinforcing agent or diluent for rubber or plastic stock [and] *wherein substantially all of the particles thereof are greater than about 0.05 micron in size,* and *wherein the preparation and coprecipitation of the compounding chemical are conducted in the presence of only that amount of water and with that degree of intimacy of mixing that will permit the particles of chemical and the particles of binder to be uniformly and homogeneously mixed and to be sufficiently close to one another so that they can come in contact and be bound together upon coagulation of the mixture,* and (c) physically separating the substantially clear serum *having optimum clarity* produced upon coagulation from the homogeneous, essentially non-tacky, [dustless,] friable particles of predispersed chemical which *are dustless upon drying, wherein the particles of predispersed chemical comprise from about 80 to about 99.5 percent by weight of said chemical and from about 0.5 to about 20 percent by weight of said binder and wherein the amounts of said chemical and said binder are selected such that a substantially clear serum having optimum clarity is obtained.*

35. A product comprising (i) substantially clear serum *having optimum clarity* and (ii) homogeneous, essentially non-tacky, [dustless,] friable particles of predispersed rubber or plastic compounding chemical which comprise from about 80 to 99.5 percent by weight of [said] *a compounding* chemical *selected from the group consisting of cross-linking agents, curing agents, accelerators, antidegradants, antioxidants, antiozonants, chemical and heat stabilizers, vulcanizing agents, blowing agents, blowing agent activators, retardants, flame retardants, cure modifiers and pigments* and from about 0.5 to about 20 percent by weight of a binder, said product prepared in accordance with a coprecipitation process comprising, (a) intimately mixing at least one finely divided rubber or plastic compounding chemical, wherein substantially all of the particles thereof are [at least] *greater than* about 0.05 micron in size, with a film-forming binder emulsion comprising a latex of a rubber or plastic polymer in the presence of [an] *only that* amount of water [which permits intimate mixture thereof] *and with that degree of intimacy of the mixing that will permit the particles of chemical and the particles of binder to be uniformly and homogeneously mixed and to be sufficiently close to one another so that they can come in contact and be bound together upon coagulation of the mixture* wherein no compounding chemical used is a *finely divided, high surface area* reinforcing agent or diluent for the rubber or plastic stock, and (b) adding a stoichiometric excess *of up to 10 percent* of a coagulating agent *which destabilizes the particles of binder by reacting with the emulsifier for the particles of binder* during further intimate mixing of the chemical and the binder emulsion to cause complete coagulation thereof, wherein the amounts of said chemical and said binder are selected such that a substantially clear serum having optimum clarity is obtained.

47. A product comprising (i) substantially clear serum *having optimum clarity* and (ii) homogeneous, essentially non-tacky, [dustless,] friable particles of predispersed rubber or plastic compounding chemical which comprise from about 80 to about 99.5 percent by weight of [said] *a compounding* chemical *selected from the group consisting of cross-linking agents, curing agents, accelerators, antidegradants, antioxidants, antiozonants, chemical and heat stabilizers, vulcanizing agents, blowing agents, blowing agent activators, retardants, flame retardants, cure modifiers and pigments,* and from about 0.5 to about 20 percent by weight of a binder, said product prepared in accordance with a coprecipitation process comprising (a) intimately mixing at least one finely divided rubber or plastic compounding chemical, wherein substantially all of the particles thereof are [at least] *greater than* about 0.05 micron in size, with a film-forming binder emulsion comprising a latex of a rubber or plastic polymer and an emulsion of a plasticizer for the polymer in the presence of [an] *only that* amount of water [which permits intimate mixture thereof] *and with that degree of intimacy of the mixing that will permit the particles of chemical and the particles of binder to be uniformly and homogeneously mixed and to be sufficiently close to one another so that they can come in contact and be bound together upon coagulation of the mixture*, wherein no compounding chemical used is a *finely divided, high surface area* reinforcing agent or diluent for the rubber or plastic stock, and (b) adding a stoichiometric excess *of up to 10 percent* of a coagulating agent *which destabilizes the particles of binder by reacting with the emulsifier for the particles of binder* during further intimate mixing of the chemical and the binder emulsion to cause complete coagulation thereof,

*wherein the amounts of said chemical and said binder are selected such that a substantially clear serum having optimum clarity is obtained.*

Claims 2–12, 14–25, 27–33, 36–46, and 48–59, dependent on amended claims, are determined to be patentable.

* * * * *